United States Patent
Watanabe et al.

(10) Patent No.: US 8,384,589 B2
(45) Date of Patent: Feb. 26, 2013

(54) POSITIONING APPARATUS FOR CALCULATING AND CORRECTING RECEPTION POSITION AND SPEED AND METHOD FOR THE SAME

(75) Inventors: Yuusuke Watanabe, Anjo (JP); Tatsuya Iwase, Aichi-gun (JP); Noriyoshi Suzuki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 12/913,987

(22) Filed: Oct. 28, 2010

(65) Prior Publication Data

US 2011/0102252 A1  May 5, 2011

(30) Foreign Application Priority Data

Oct. 30, 2009 (JP) ................................ 2009-251435

(51) Int. Cl.
*G01S 19/40* (2010.01)
(52) U.S. Cl. ................................. 342/357.23
(58) Field of Classification Search ............... 342/357.23
See application file for complete search history.

(56) References Cited

U.S. PATENT DOCUMENTS

| 7,987,047 B2* | 7/2011 | Ishigami et al. ........... 701/478.5 |
| 2006/0227044 A1 | 10/2006 | Terashima et al. |
| 2008/0158053 A1 | 7/2008 | Watanabe |

FOREIGN PATENT DOCUMENTS

| JP | A-6-265626 | 9/1994 |
| JP | A-2009-139281 | 6/2009 |

OTHER PUBLICATIONS

E. Kaplan, et al., "Understanding GPS: Principles and Applications," Second Edition, Artech House Publishers (Nov. 30, 2005).
"Practical Programming for GPS," by Takeyasu Sakai, Tokyo Denki University Press, 2007. (Discussed on p. 18 of the Specification; Partial English translation enclosed).

* cited by examiner

*Primary Examiner* — Harry Liu
(74) *Attorney, Agent, or Firm* — Posz Law Group, PLC

(57) ABSTRACT

A positioning apparatus includes: a first positioning device for calculating a reception position of a GPS receiver with respect to each combination of satellites based on a pseudo distance from each positioning satellite to the reception position; a component error calculator for calculating an error of at least one component in a calculation result of the first positioning device; a pseudo distance error calculator for obtaining a relation equation between the error of the at least one component and an error of the pseudo distance, and for solving simultaneous equations comprising the relation equation so that the error of the pseudo distance with respect to each positioning satellite is calculated; and a second positioning device for correcting the reception position based on the error of the pseudo distance.

22 Claims, 9 Drawing Sheets

POSITIONING APPARATUS FOR CALCULATING AND CORRECTING RECEPTION POSITION AND SPEED AND METHOD FOR THE SAME

CROSS REFERENCE TO RELATED APPLICATION

This application is based on Japanese Patent Application No. 2009-251435 filed on Oct. 30, 2009, the disclosure of which is incorporated herein by reference.

FIELD OF THE INVENTION

The present invention relates to a positioning apparatus for calculating and correcting a reception position and a speed based on a satellite signal from a positioning satellite and a method for the same.

BACKGROUND OF THE INVENTION

Conventionally, a GPS positioning apparatus having high positioning accuracy reduces a multipath effect. The apparatus is disclosed in JP-A-2008-139247, which corresponds to US 2008/0158053. The GPS positioning apparatus includes an altitude information memory for storing altitude information $Z0$ of a mobile object, a combination calculator for obtaining a combination of GPS satellites among multiple GPS satellites, from which the apparatus can capture signals, a position calculator for measuring a three dimensional position of the mobile object in each combination of GPS satellites, a difference calculator for calculating a difference between the altitude information $Z0$ stored in the memory and altitude information $Z$ obtained from the three dimensional position, and a position determination element for comparing the calculated difference with a predetermined threshold value, for selecting a combination of GPS satellites that provides the difference equal to or smaller than the threshold value, and for determining the position of the mobile object based on the three dimensional position calculated from the selected combination of GPS satellites.

Further, a method for displaying a position with high accuracy is disclosed in JP-A-2009-139281. The position is calculated with reducing cases of false detection or nondetectable cases, which are caused by the multipath effect, so that the detected position is not affected by the multipath effect. In this method, orbit information and time information transmitted from the positioning satellite are received. Based on the time information, the pseudo distance between the positioning satellite and the receiver is calculated. Based on the orbit information and the time information, the position of the positioning satellite is calculated. Based on the calculated pseudo distance and the calculated position of the satellite, the current position of the receiver is calculated. Further, estimated position of the receiver is calculated, and based on the estimated position of the receiver and the position of the satellite, an estimated pseudo distance is calculated. Based on the difference between the actual pseudo distance and the estimated pseudo distance, the error of estimated observation of the pseudo distance is calculated. The error of the estimated observation is divided by a standard variation of the error of the estimated observation, and, based on the divided result, existence of the multipath effect is determined. In this method, the error of pseudo distance is defined by a difference between the estimated pseudo distance, which is obtained from the past positioning result, and the currently calculated pseudo distance. With using the error of pseudo distance, the method determines whether the multipath effect occurs. When the multipath effect occurs, the current observation information is deleted. When the multipath effect does not occur, the current observation information is used for next process of positioning.

In JP-A-2008-139247, when the error of altitude is large, the three-dimensional or two-dimensional positioning error is also large. However, correlation between the altitude error and the positioning error is small. Accordingly, it is difficult to determine based on only the altitude information whether the calculated position is proper. Thus, it is difficult to calculate the position of the receiver with high accuracy.

In JP-A-2009-139281, it is assumed that the past positioning result is proper, and the past positioning result is used as a reference. When the object is disposed in a city center, in which the multipath effect occurs continuously, it is necessary to search the past positioning result, which can be used as the reference. This search takes much time. Therefore, the position of the mobile object during the search time is estimated by a linear estimation method. Thus, the past positioning result may include error, and the pseudo distance error may be improper.

SUMMARY OF THE INVENTION

In view of the above-described problem, it is an object of the present disclosure to provide a positioning apparatus and a method for calculating and correcting a pseudo distance error with high accuracy so that a position of a mobile object is detected with high accuracy. It is another object of the present disclosure to provide a positioning apparatus and a method for calculating and correcting a Doppler shift error with high accuracy so that a speed of the mobile object is detected with high accuracy.

According to a first aspect of the present disclosure, a positioning apparatus includes: a first positioning device for calculating a reception position of a GPS receiver with respect to each combination of a plurality of positioning satellites based on a pseudo distance from each positioning satellite to the reception position, wherein the GPS receiver calculates the pseudo distance based on a satellite signal transmitted from a corresponding satellite and outputs the pseudo distance to the first positioning device; a component error calculator for calculating an error of at least one component in a calculation result of the first positioning device with respect to each combination of the plurality of positioning satellites; a pseudo distance error calculator for obtaining a relation equation with respect to each combination of the plurality of positioning satellites between the error of the at least one component with respect to a corresponding combination of the plurality of positioning satellites and an error of the pseudo distance from each positioning satellite to the reception position based on the error of at least one component calculated by the component error calculator, and for solving simultaneous equations comprising the relation equation so that the error of the pseudo distance with respect to each positioning satellite is calculated; and a second positioning device for correcting the reception position based on the error of the pseudo distance with respect to each positioning satellite calculated by the pseudo distance error calculator.

In the above apparatus, the error of the pseudo distance is calculated with high accuracy, and therefore, the reception position is corrected with high accuracy.

According to a second aspect of the present disclosure, a positioning apparatus includes: a first positioning device for calculating a speed of a GPS receiver with respect to each combination of a plurality of positioning satellites based on a Doppler shift of a satellite signal from each positioning satellite, wherein the GPS receiver calculates the Doppler shift based on the satellite signal transmitted from a corresponding satellite and outputs the Doppler shift to the first positioning device; a component error calculator for calculating an error of at least one component in a calculation result of the first positioning device with respect to each combination of the plurality of positioning satellites; a Doppler shift error calculator for obtaining a relation equation with respect to each combination of the plurality of positioning satellites between the error of the at least one component with respect to a corresponding combination of the plurality of positioning satellites and an error of the Doppler shift of the plurality of positioning satellites based on the error of at least one component calculated by the component error calculator, and for solving simultaneous equations comprising the relation equation so that the error of the Doppler shift with respect to each positioning satellite is calculated; and a second positioning device for correcting the speed based on the error of the Doppler shift with respect to each positioning satellite calculated by the Doppler shift error calculator.

In the above apparatus, the error of the Doppler shift is calculated with high accuracy, and therefore, the speed of the GPS receiver is corrected with high accuracy.

According to a third aspect of the present disclosure, a positioning apparatus includes: a first positioning device for calculating a reception position of a GPS receiver with respect to each combination of a plurality of positioning satellites based on a pseudo distance from each positioning satellite to the reception position, wherein the GPS receiver calculates the pseudo distance based on a satellite signal transmitted from a corresponding satellite and outputs the pseudo distance to the first positioning device; a component error calculator for calculating an error of at least one component in a calculation result of the first positioning device with respect to each combination of the plurality of positioning satellites; a first pseudo distance error calculator for obtaining a first relation equation with respect to each combination of the plurality of positioning satellites between the error of the at least one component with respect to a corresponding combination of the plurality of positioning satellites and an error of the pseudo distance from each positioning satellite to the reception position based on the error of at least one component calculated by the component error calculator, and for solving simultaneous equations comprising the first relation equation so that the error of the pseudo distance with respect to each positioning satellite is calculated; a satellite selector for selecting at least one satellite having a normal satellite signal among the plurality of satellites; a second pseudo distance error calculator for obtaining a second relation equation with respect to each combination of the plurality of positioning satellites between the error of the at least one component with respect to a corresponding combination of the plurality of positioning satellites and an error of the pseudo distance from each positioning satellite to the reception position based on the error of at least one component calculated by the component error calculator, and for solving simultaneous equations comprising the second relation equation and a third relation equation so that the error of the pseudo distance with respect to each positioning satellite is corrected, wherein the third relation equation is a predetermined equation of an error of a pseudo distance with respect to the at least one satellite selected by the satellite selector; and a second positioning device for correcting the reception position based on the error of the pseudo distance with respect to each positioning satellite calculated by the second pseudo distance error calculator.

In the above apparatus, the error of the pseudo distance is calculated with high accuracy, and therefore, the reception position is corrected with high accuracy.

According to a fourth aspect of the present disclosure, a positioning apparatus includes: a first positioning device for calculating a speed of a GPS receiver with respect to each combination of a plurality of positioning satellites based on a Doppler shift of a satellite signal from each positioning satellite, wherein the GPS receiver calculates the Doppler shift based on the satellite signal transmitted from a corresponding satellite and outputs the Doppler shift to the first positioning device; a component error calculator for calculating an error of at least one component in a calculation result of the first positioning device with respect to each combination of the plurality of positioning satellites; a first Doppler shift error calculator for obtaining a first relation equation with respect to each combination of the plurality of positioning satellites between the error of the at least one component with respect to a corresponding combination of the plurality of positioning satellites and an error of the Doppler shift of the plurality of positioning satellites based on the error of at least one component calculated by the component error calculator, and for solving simultaneous equations comprising the first relation equation so that the error of the Doppler shift with respect to each positioning satellite is calculated; a satellite selector for selecting at least one satellite having a normal satellite signal among the plurality of satellites; a second Doppler shift error calculator for obtaining a second relation equation with respect to each combination of the plurality of positioning satellites between the error of the at least one component with respect to a corresponding combination of the plurality of positioning satellites and an error of the Doppler shift of the plurality of positioning satellites based on the error of at least one component calculated by the component error calculator, and for solving simultaneous equations comprising the second relation equation and a third relation equation so that the error of the Doppler shift with respect to each positioning satellite is corrected, wherein the third relation equation is a predetermined equation of an error of a Doppler shift with respect to the at least one satellite selected by the satellite selector; and a second positioning device for correcting the speed based on the error of the Doppler shift with respect to each positioning satellite calculated by the second Doppler shift error calculator.

In the above apparatus, the error of the Doppler shift is calculated with high accuracy, and therefore, the speed of the GPS receiver is corrected with high accuracy.

According to a fifth aspect of the present disclosure, a positioning apparatus includes: a first positioning device for calculating a reception position of a GPS receiver with respect to each combination of a plurality of positioning satellites based on a pseudo distance from each positioning satellite to the reception position, wherein the GPS receiver calculates the pseudo distance based on a satellite signal transmitted from a corresponding satellite and outputs the pseudo distance to the first positioning device; a height component error calculator for calculating an error of a height component of the reception position calculated by the first positioning device with respect to each combination of the plurality of positioning satellites; a pseudo distance error calculator for obtaining a relation equation with respect to each combination of the plurality of positioning satellites between the error of the height component with respect to a corresponding combination of the plurality of positioning satellites and an error of the pseudo distance from each positioning satellite to the reception position based on the error of the height component calculated by the height component error calculator, and for solving simultaneous equations comprising the relation equation so that the error of the pseudo distance with respect to each positioning satellite is calculated; and a second positioning device for correcting the reception position based on the error of the pseudo distance with respect to each positioning satellite calculated by the pseudo distance error calculator.

In the above apparatus, the error of the pseudo distance is calculated with high accuracy, and therefore, the reception position is corrected with high accuracy.

According to a sixth aspect of the present disclosure, a positioning apparatus includes: a first positioning device for calculating a speed of a GPS receiver with respect to each combination of a plurality of positioning satellites based on a Doppler shift of a satellite signal from each positioning satellite, wherein the GPS receiver calculates the Doppler shift based on the satellite signal transmitted from a corresponding satellite and outputs the Doppler shift to the first positioning device; a speed component error calculator for calculating an error of the speed in a height direction calculated by the first positioning device with respect to each combination of the plurality of positioning satellites; a Doppler shift error calculator for obtaining a relation equation with respect to each combination of the plurality of positioning satellites between the error of the speed in the height direction with respect to a corresponding combination of the plurality of positioning satellites and an error of the Doppler shift of the plurality of positioning satellites based on the error of the speed in the height direction calculated by the speed component error calculator, and for solving simultaneous equations comprising the relation equation so that the error of the Doppler shift with respect to each positioning satellite is calculated; and a second positioning device for correcting the speed based on the error of the Doppler shift with respect to each positioning satellite calculated by the Doppler shift error calculator.

In the above apparatus, the error of the Doppler shift is calculated with high accuracy, and therefore, the speed of the GPS receiver is corrected with high accuracy.

According to a seventh aspect of the present disclosure, a method for correcting a reception position of a GPS receiver includes: calculating a reception position of a GPS receiver with respect to each combination of a plurality of positioning satellites based on a pseudo distance from each positioning satellite to the reception position, wherein the GPS receiver calculates the pseudo distance based on a satellite signal transmitted from a corresponding satellite; calculating an error of at least one component in a calculation result of the calculating of the reception position with respect to each combination of the plurality of positioning satellites; obtaining a relation equation with respect to each combination of the plurality of positioning satellites between the error of the at least one component with respect to a corresponding combination of the plurality of positioning satellites and an error of the pseudo distance from each positioning satellite to the reception position based on the error of at least one component calculated in the calculating of the error, and solving simultaneous equations comprising the relation equation so that the error of the pseudo distance with respect to each positioning satellite is calculated; and correcting the reception position based on the error of the pseudo distance with respect to each positioning satellite calculated in the obtaining of the relation equation and the solving of the simultaneous equations.

In the above apparatus, the error of the pseudo distance is calculated with high accuracy, and therefore, the reception position is corrected with high accuracy.

According to an eighth aspect of the present disclosure, a method for correcting a speed of a GPS receiver includes: calculating a speed of a GPS receiver with respect to each combination of a plurality of positioning satellites based on a Doppler shift of a satellite signal from each positioning satellite, wherein the GPS receiver calculates the Doppler shift based on the satellite signal transmitted from a corresponding satellite; calculating an error of at least one component in a calculation result of the calculating of the speed with respect to each combination of the plurality of positioning satellites; obtaining a relation equation with respect to each combination of the plurality of positioning satellites between the error of the at least one component with respect to a corresponding combination of the plurality of positioning satellites and an error of the Doppler shift of the plurality of positioning satellites based on the error of at least one component calculated in the calculating of the error, and solving simultaneous equations comprising the relation equation so that the error of the Doppler shift with respect to each positioning satellite is calculated; and correcting the speed based on the error of the Doppler shift with respect to each positioning satellite calculated in the obtaining of the relation equation and the solving of the simultaneous equations.

In the above apparatus, the error of the Doppler shift is calculated with high accuracy, and therefore, the speed of the GPS receiver is corrected with high accuracy.

According to a ninth aspect of the present disclosure, a method for correcting a reception position of a GPS receiver includes: calculating a reception position of a GPS receiver with respect to each combination of a plurality of positioning satellites based on a pseudo distance from each positioning satellite to the reception position, wherein the GPS receiver calculates the pseudo distance based on a satellite signal transmitted from a corresponding satellite; calculating an error of at least one component in a calculation result in the calculating of the reception position with respect to each combination of the plurality of positioning satellites; obtaining a first relation equation with respect to each combination of the plurality of positioning satellites between the error of the at least one component with respect to a corresponding combination of the plurality of positioning satellites and an error of the pseudo distance from each positioning satellite to the reception position based on the error of at least one component calculated in the calculating of the error, and solving simultaneous equations comprising the first relation equation so that the error of the pseudo distance with respect to each positioning satellite is calculated; selecting at least one satellite having a normal satellite signal among the plurality of satellites; obtaining a second relation equation with respect to each combination of the plurality of positioning satellites between the error of the at least one component with respect to a corresponding combination of the plurality of positioning satellites and an error of the pseudo distance from each positioning satellite to the reception position based on the error of at least one component calculated in the calculating of the error, and solving simultaneous equations comprising the second relation equation and a third relation equation so that the error of the pseudo distance with respect to each positioning satellite is corrected, wherein the third relation equation is a predetermined equation of an error of a pseudo distance with respect to the at least one satellite selected in the selecting of the at least one satellite; and correcting the reception position based on the error of the pseudo distance with respect to each positioning satellite corrected in the obtaining of the second relation equation and the solving of the simultaneous equations.

In the above apparatus, the error of the pseudo distance is calculated with high accuracy, and therefore, the reception position is corrected with high accuracy.

According to a tenth aspect of the present disclosure, a method for correcting a speed of a GPS receiver includes: calculating a speed of a GPS receiver with respect to each combination of a plurality of positioning satellites based on a Doppler shift of a satellite signal from each positioning satellite, wherein the GPS receiver calculates the Doppler shift based on the satellite signal transmitted from a corresponding satellite; calculating an error of at least one component in a calculation result in the calculating of the speed with respect to each combination of the plurality of positioning satellites; obtaining a first relation equation with respect to each combination of the plurality of positioning satellites between the error of the at least one component with respect to a corresponding combination of the plurality of positioning satellites and an error of the Doppler shift of the plurality of positioning satellites based on the error of at least one component calculated in the calculating of the error, and solving simultaneous equations comprising the first relation equation so that the error of the Doppler shift with respect to each positioning satellite is calculated; selecting at least one satellite having a normal satellite signal among the plurality of satellites; obtaining a second relation equation with respect to each combination of the plurality of positioning satellites between the error of the at least one component with respect to a corresponding combination of the plurality of positioning satellites and an error of the Doppler shift of the plurality of positioning satellites based on the error of at least one component calculated in the calculating of the error, and solving simultaneous equations comprising the second relation equation and a third relation equation so that the error of the Doppler shift with respect to each positioning satellite is corrected, wherein the third relation equation is a predetermined equation of an error of a Doppler shift with respect to the at least one satellite selected in the selecting of the at least one satellite; and correcting the speed based on the error of the Doppler shift with respect to each positioning satellite corrected in the obtaining of the second relation equation and the solving of the simultaneous equations.

In the above apparatus, the error of the Doppler shift is calculated with high accuracy, and therefore, the speed of the GPS receiver is corrected with high accuracy.

According to an eleventh aspect of the present disclosure, a method for correcting a reception position of a GPS receiver includes: calculating a reception position of a GPS receiver with respect to each combination of a plurality of positioning satellites based on a pseudo distance from each positioning satellite to the reception position, wherein the GPS receiver calculates the pseudo distance based on a satellite signal transmitted from a corresponding satellite; calculating an error of a height component of the reception position calculated in the calculating of the reception position with respect to each combination of the plurality of positioning satellites; obtaining a relation equation with respect to each combination of the plurality of positioning satellites between the error of the height component with respect to a corresponding combination of the plurality of positioning satellites and an error of the pseudo distance from each positioning satellite to the reception position based on the error of the height component calculated in the calculating of the error, and solving simultaneous equations comprising the relation equation so that the error of the pseudo distance with respect to each positioning satellite is calculated; and correcting the reception position based on the error of the pseudo distance with respect to each positioning satellite calculated in the obtaining of the relation equation and the solving of the simultaneous equations.

In the above apparatus, the error of the pseudo distance is calculated with high accuracy, and therefore, the reception position is corrected with high accuracy.

According to a twelfth aspect of the present disclosure, a method for correcting a speed of a GPS receiver includes: calculating a speed of a GPS receiver with respect to each combination of a plurality of positioning satellites based on a Doppler shift of a satellite signal from each positioning satellite, wherein the GPS receiver calculates the Doppler shift based on the satellite signal transmitted from a corresponding satellite; calculating an error of the speed in a height direction calculated in the calculating of the speed with respect to each combination of the plurality of positioning satellites; obtaining a relation equation with respect to each combination of the plurality of positioning satellites between the error of the speed in the height direction with respect to a corresponding combination of the plurality of positioning satellites and an error of the Doppler shift of the plurality of positioning satellites based on the error of the speed in the height direction calculated in the calculating of the error, and solving simultaneous equations comprising the relation equation so that the error of the Doppler shift with respect to each positioning satellite is calculated; and correcting the speed based on the error of the Doppler shift with respect to each positioning satellite calculated in the obtaining of the relation equation and the solving of the simultaneous equations.

In the above apparatus, the error of the Doppler shift is calculated with high accuracy, and therefore, the speed of the GPS receiver is corrected with high accuracy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

A mobile object is a vehicle, and a positioning apparatus is a in-vehicle positioning apparatus for detecting a reception position of the vehicle.

Figure 1:
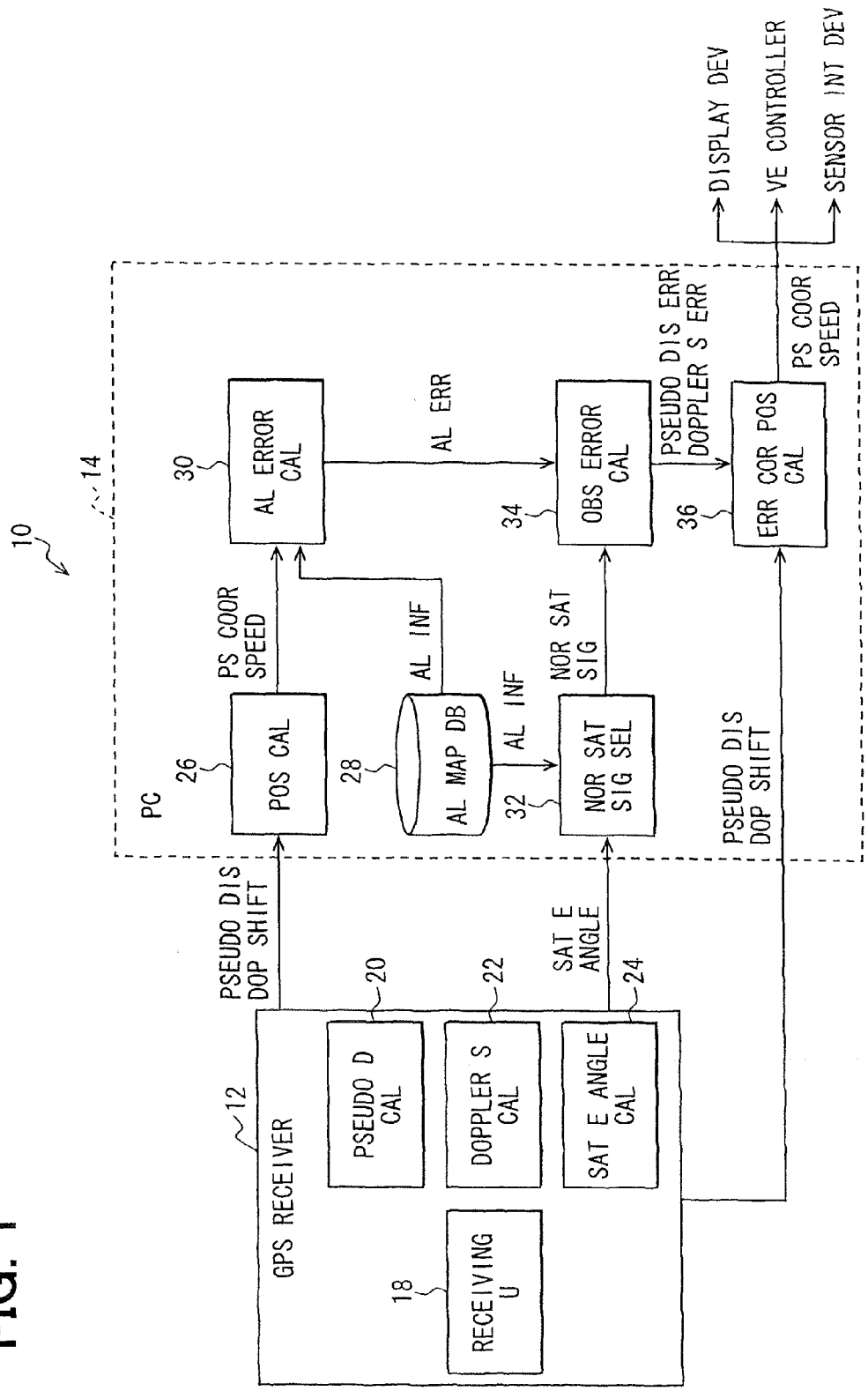
FIG. 1 is a block diagram showing an in-vehicle positioning apparatus according to a first embodiment.

As shown in FIG. 1, the in-vehicle positioning apparatus 10 includes a GPS receiver 12 for receiving an electric wave from a positioning satellite and for outputting information of a satellite signal and a computer 14 for detecting the reception position based on the output from the GPS receiver 12.

The GPS receiver 12 includes a receiving unit 18 for receiving the satellite signal transmitted from the positioning satellite, a pseudo distance calculator 20 for calculating a pseudo distance between the positioning satellite and the reception position based on the satellite signal transmitted from all positioning satellites to the receiving unit 18 and for outputting the pseudo distance to the computer 14, a Doppler shift calculator for calculating a Doppler shift frequency of each satellite signal based on all of the satellite signals transmitted from all satellites, and a satellite elevation angle calculator 24 for calculating a satellite position of each satellite with using satellite information based on the satellite signal and for calculating an elevation angle of each satellite position at the reception position. Here, the pseudo distance is defined as a propagation distance of the received signal from each positioning satellite. Further, the GPS receiver 12 obtains a satellite number of the GPS satellite, a phase of a carrier wave, a signal strength of the wave and the like as information of the GPS satellites based on the satellite signals transmitted from all satellites. Then, the GPS receiver 12 outputs the information of the GPS satellites to the computer 14.

The computer 14 includes a CPU, a ROM for storing various programs, which execute a positioning process, a RAM for storing data temporally and a HDD.

The positioning process executed by the computer 14 is shown by a function blocks in FIG. 1. Specifically, the computer 14 includes a position calculator 26 for calculating position coordinates of the reception position and a speed of the vehicle based on the pseudo distance and the Doppler shift frequency input from the GPS receiver 12, a altitude map database 28 for storing altitude map data, which shows altitude information of each point, an altitude error calculator 30 for calculating an altitude error and a speed error in the height direction based on the altitude information obtained from the altitude map data and the calculated position coordinates and speed, a normal satellite selector 32 for selecting at least four normal satellite signals from four GPS satellites based on the satellite elevation angle obtained from the GPS receiver and the altitude information obtained from the altitude map data, an observation error calculator 34 for calculating a pseudo distance error and a Doppler shift error based on the altitude error and the speed error in the height direction obtained from the altitude error calculator 30 and the selected satellite signals, and a error correction and positioning calculator 36 for the position coordinates of the reception position and the speed of the vehicle, which are corrected based on the pseudo distance and the Doppler shift frequency obtained from the GPS receiver 12, and the pseudo distance error and the Doppler shift error calculated by the observation error calculator 34.

The positioning calculator 26 calculates position coordinates of the reception position based on the pseudo distance and the satellite position output from the GPS receiver 12 with using four or more satellite signals received from four positioning satellites by a Newton Raphson method.

The pseudo distance Ri of the satellite i is obtained from the following formula (1). Here, the position coordinates of the satellite i is defined as $(x_i, y_i, z_i)$. The initial coordinates of the estimated position of the GPS receiver 12 is defined as $(x_0, y_0, z_0)$. The actual position coordinates of the GPS receiver 12 is defined as $(x_p, y_p, z_p)$. The initial value of the estimated clock bias of the GPS receiver 12 is defined as B0, and the clock bias of the satellite i is defined as bi.

$$R_i = \sqrt{(x_i-x_p)^2+(y_i-y_p)^2+(z_i-z_p)^2}+B+b_i \qquad (1)$$

Further, the difference between the actual position coordinates of the GPS receiver 12 and the estimated position coordinates is defined as Δ. The following formula (2) is obtained.

$$\left.\begin{aligned} x_p &= x_0 + \Delta x \\ y_p &= y_0 + \Delta y \\ z_p &= z_0 + \Delta z \\ B &= B_0 + \Delta B \end{aligned}\right\} \qquad (2)$$

When the formula (1) is linearized with the formula (2), the formula (3) is obtained.

$$\Delta R_i = \frac{\partial R_i}{\partial x}\Delta x + \frac{\partial R_i}{\partial y}\Delta y + \frac{\partial R_i}{\partial z}\Delta z + \Delta B \qquad (3)$$

$$\left.\begin{aligned} \frac{\partial R_i}{\partial x} &= \frac{-(x_i-x_0)}{\sqrt{(x_i-x_0)^2+(y_i-y_0)^2+(z_i-z_0)^2}} = \alpha_i \\ \frac{\partial R_i}{\partial y} &= \frac{-(y_i-y_0)}{\sqrt{(x_i-x_0)^2+(y_i-y_0)^2+(z_i-z_0)^2}} = \beta_i \\ \frac{\partial R_i}{\partial z} &= \frac{-(z_i-z_0)}{\sqrt{(x_i-x_0)^2+(y_i-y_0)^2+(z_i-z_0)^2}} = \gamma_i \end{aligned}\right\}$$

When the formula (3) is transcribed in a matrix expression form with regard to all satellites, the formula (4) is obtained. Further, when the formula (4) is transcribed with using the formula (5), the formula (6) is obtained.

$$\begin{pmatrix} \Delta R_1 \\ \Delta R_2 \\ \vdots \\ \Delta R_m \end{pmatrix} = \begin{pmatrix} \alpha_1 & \beta_1 & \gamma_1 & 1 \\ \alpha_2 & \beta_2 & \gamma_2 & 1 \\ \vdots & \vdots & \vdots & \vdots \\ \alpha_m & \beta_m & \gamma_m & 1 \end{pmatrix} \begin{pmatrix} \Delta x \\ \Delta y \\ \Delta z \\ \Delta B \end{pmatrix} \qquad (4)$$

$$A = \begin{pmatrix} \alpha_1 & \beta_1 & \gamma_1 & 1 \\ \alpha_2 & \beta_2 & \gamma_2 & 1 \\ \vdots & \vdots & \vdots & \vdots \\ \alpha_m & \beta_m & \gamma_m & 1 \end{pmatrix} \quad \Delta R = \begin{pmatrix} \Delta R_1 \\ \Delta R_2 \\ \vdots \\ \Delta R_m \end{pmatrix} \quad \Delta X = \begin{pmatrix} \Delta x \\ \Delta y \\ \Delta z \\ \Delta B \end{pmatrix} \qquad (5)$$

$$\Delta R = A \Delta X \qquad (6)$$

Here, when the value m is larger than four, i.e., when the relation of m>4 is satisfied, although four variable numbers should be calculated, the number of formulas is larger than four. Thus, the formulas provide an overdeterminacy system. With using a least-square method, a solution is obtained to comply with a limitation that the number of formulas is m as much as possible. Thus, the solution is obtained with the formula (7).

$$\Delta X = (A^T A)^{-1} A^T \Delta R \qquad (7)$$

With using the value of ΔX obtained from the formula (7), the formula (2) is updated. Then, this process is repeated until the estimated value converges. Thus, the position value of the reception position and the clock bias B are calculated.

The positioning calculator 26 calculates the position coordinates of the reception position with respect to the combination of n satellites and all combinations of (n−1) satellites by an optimum estimation method with the least-square method. Here, the number of all satellites, from which the apparatus receives a satellite signal, is defined as n. The number of combinations of (n−1) satellites is n.

The positioning calculator 26 calculates a vector $v=(v_x, v_y, v_h, d)$, which represents a speed (i.e., vehicle speed) and a clock drift of the GPS receiver 12, based on the Doppler shift frequency and the satellite position output from the GPS receiver 12 with respect to the combination of n satellites and all combinations of (n−1) satellites by the optimum estimation method with the least-square method. Here, $v_x$ represents a speed in a longitudinal direction, $v_y$ represents a speed in a latitudinal direction, $v_h$ represents a speed in a height direction, and d represents a clock drift. Each speed and the clock drift are calculated by the optimum estimation method, which is disclosed in the book "Practical Programming for GPS," by Takeyasu Sakai, Tokyo Denki University Press, 2007.

The altitude map database 28 stores altitude map data showing altitude information at each position coordinates. When the coordinates of longitude and latitude is defined as (x, y), and the altitude is defined as $h_{ref}$. The altitude $h_{ref}$ is obtained by the following function represented by the formula (8).

$$h_{ref}=f(x,y) \tag{8}$$

The altitude error calculator 30 calculates the altitude error $e_h$ with using the following formula (9) based on the height component h at a certain position calculated by the positioning calculator 26 and the altitude $h_{ref}$ at the certain position obtained from the altitude map database 28.

$$e_h=h-h_{ref} \tag{9}$$

The standard value $vh_{ref}$ of the speed in the height direction is calculated with using the following formula (10) based on the gradient $\dot{h}$ of the altitude $h_{ref}$ at the certain position obtained from the altitude map database 28 and the speed v calculated by the positioning calculator 26.

$$vh_{ref}=\dot{h}_{ref}*|v| \tag{10}$$

When the vehicle is disposed on the flat place, the standard value of the speed in the height direction may be zero.

$$vh_{ref}=0 \tag{11}$$

The error $e_{vh}$ of the speed in the height direction is calculated by the formula (12) with using the formulas (9) and (10).

$$e_{vh}=v_h-vh_{ref} \tag{12}$$

Here, the $v_h$ is a height component of the speed calculated by the positioning calculator 26.

The normal satellite selector 32 selects four positioning satellites having top four highest elevation angles based on the elevation angle of the satellite output from the GPS receiver 12. The normal satellite selector 32 calculates the reception position based on the pseudo distances of four positioning satellites. The normal satellite selector 32 obtains the altitude information corresponding to the reception position from the altitude map data. Further, the normal satellite selector 32 calculates the altitude error based on the altitude component of the reception position and the altitude information. The normal satellite selector 32 determines whether the altitude error is smaller than a predetermined threshold value. When the altitude error is smaller than the predetermined threshold value, the normal satellite selector 32 determines that four positioning satellites provide proper satellite signals, i.e., four positioning satellites are proper. When the altitude error is equal to or larger than the predetermined threshold value, the normal satellite selector 32 determines that four positioning satellites are not proper. In this embodiment, the normal satellite selector 32 selects the positioning satellite having the high elevation angle and small altitude error as the normal positioning satellite. The number of the normal positioning satellites is at least four. When the number of the normal positioning satellites increases, the accuracy of calculating the reception position is made high.

Next, a principle for calculating the pseudo distance error e will be explained.

The position coordinates of the vehicle are calculated by the formula (13) with using the Newton-Raphson method.

$$\Delta x = x - x_0$$

$$\Delta r_i = r_i - |x_0 - x_i|$$

$$\Delta r = H \Delta x \tag{13}$$

Here, $x_0$ represents an initial estimation value of the vehicle position. $x_i$ represents a position of the i-th satellite. $r_i$ represents a pseudo distance of the i-th satellite, which is corrected with respect to the delay of the ionization layer, the delay of the troposphere and a satellite clock bias. $\Delta r$ represents a vector expression of $\Delta r_i$. H represents a geometric matrix for characterizing the satellite arrangement. The value of $\Delta x$ is calculated by the formula (14) with using the least-square method.

$$\Delta x = H^+ \Delta r \tag{14}$$

Here, $H^+$ represents a pseudo inverse matrix of the geometric matrix H. When the pseudo distance includes the observation error e derived from the multipath effect, the estimation result of the position also includes an error. Thus, the observation error e as the pseudo distance error and the positioning error $e_x$ has the following relationship.

$$\Delta x + e_x = H^+(\Delta r + e)$$

$$\therefore e_x = H^+ e \tag{15}$$

The above formula is defined as an error relation equation. According to the error relation equation, the pseudo distance error e is calculated from the altitude error $e_h$.

When the error relation equation is expressed with components, the formula (16) is obtained.

$$\begin{bmatrix} e_x \\ e_y \\ e_h \\ e_b \end{bmatrix} = \begin{bmatrix} a_1 & & a_n \\ b_1 & & b_n \\ c_1 & \cdots & c_n \\ d_1 & & d_n \end{bmatrix} \begin{bmatrix} e_1 \\ e_2 \\ \vdots \\ e_n \end{bmatrix} \tag{16}$$

Here, the height direction components are described in the third row. When the number of the satellites is n, with regard to the combination of all satellites and n combinations of (n−1) satellites, the positioning calculation based on the pseudo distance is performed, so that the following formula (17) is obtained. Specifically, the formula (17) includes (n+1) equations with respect to the altitude direction.

$$\begin{bmatrix} e_x \\ e_{h1} \\ \vdots \\ e_{hn} \end{bmatrix} = \begin{bmatrix} c_1 & & c_n \\ 0 & & c_n \\ c_1 & \cdots & c_n \\ c_1 & & 0 \end{bmatrix} \begin{bmatrix} e_1 \\ e_2 \\ \vdots \\ e_n \end{bmatrix} \tag{17}$$

In the present embodiment, the above formula (17) is defined as a constraint equation. In the formula (17), unknown values are four, i.e., x=(x, y, h, b). Since only the altitude information is used in the constraint equation, the rank of the right side matrix is (n−3). Thus, three more equations are necessary to solve the equation. Thus, three satellites having top three highest elevation angles are selected among the four normal satellites. Assuming that the error relating to the three satellites is zero, the following formula (18) is obtained. Specifically, three equations provided by the formula (18) are obtained.

$$0 = [0 \cdots 1 \cdots 0] \begin{bmatrix} e_1 \\ \vdots \\ e_i \\ \vdots \\ e_n \end{bmatrix} \quad (18)$$

These equations are added to the constraint equation. Thus, the formula (19) as a new constraint equation is obtained.

$$\begin{bmatrix} e_h \\ e_{h1} \\ \vdots \\ e_{hn} \\ 0 \\ \vdots \end{bmatrix} = \begin{bmatrix} c_1 & & c_n \\ 0 & \cdots & c_n \\ c_1 & & c_n \\ c_1 & & 0 \\ 0 & \cdots & 1 & \cdots & 0 \\ & \vdots & \end{bmatrix} \begin{bmatrix} e_1 \\ e_2 \\ \vdots \\ e_n \end{bmatrix} \quad (19)$$

The above formula (19) is rewritten in a vector form, so that the formula (20) is obtained.

$$e_h = Be \quad (20)$$

The pseudo distance error of each satellite is calculated by the formula (21) with using the least-square method.

$$e = B^+ e_h \quad (21)$$

The observation error calculator 34 calculates a relation equation between the altitude error with respect to each combination of the satellites and the pseudo distance error of all satellites with respect to each of the combinations of four or more satellites based on the pseudo distance obtained from the GPS receiver 12 and the altitude error calculated by the altitude error calculator 30. Thus, the above formula (17) is obtained. Here, the combinations of the satellites include the combination of all satellites, from which the satellite signals are received, and the n combinations of the (n−1) satellites, which are obtained by removing one satellite from all satellite. The observation error calculator 34 calculates the relationship between the altitude error and the pseudo distance error of all satellites with respect to three normal satellites, which has top three highest elevation angle and selected from four normal satellites, so that the formula (18) is obtained. The observation error calculator 34 obtains the formula (19), i.e., the formula (20), which is calculated from the formula (17) obtained with respect to each combination of the satellites and the formula (18) with respect to three normal satellites. Then, the observation error calculator 34 solves simultaneous equations shown as the formula (20) with using the formula (21), so that the pseudo distance error of all satellites is obtained.

Next, a principle of calculating the Doppler shift error will be explained.

The Doppler shift error $e_d$ can be calculated from the speed error in the height direction, similar to the calculation method of the pseudo distance error.

The relationship between the speed error and the Doppler shift error is shown in the formula (22).

$$\begin{bmatrix} e_{vx} \\ e_{vy} \\ e_{vh} \\ e_{vd} \end{bmatrix} = \begin{bmatrix} a_1 & & a_n \\ b_1 & & b_n \\ c_1 & \cdots & c_n \\ d_1 & & d_n \end{bmatrix} \begin{bmatrix} e_{d1} \\ e_{d2} \\ \vdots \\ e_{dn} \end{bmatrix} \quad (22)$$

The height direction relates to the third row. When the number of satellites is n, the positioning calculation with respect to the combination of all satellites and n combinations of (n−1) satellites is performed, so that the (n+1) equations with respect to the height direction are calculated, so that the formula (23) is obtained.

$$\begin{bmatrix} e_{vh} \\ e_{vh1} \\ \vdots \\ e_{vhn} \end{bmatrix} = \begin{bmatrix} c_1 & & c_n \\ 0 & & c_n \\ c_1 & \cdots & c_n \\ c_1 & & 0 \end{bmatrix} \begin{bmatrix} e_{d1} \\ e_{d2} \\ \vdots \\ e_{dn} \end{bmatrix} \quad (23)$$

The formula (23) is defined as a constraint equation. The unknown values are four, i.e., vector $v=(v_x, v_y, v_h, b)$. Since only the altitude information is used in the constraint equation, the rank of the right side matrix is (n−3). Thus, three more equations are necessary to solve the equation. Thus, three satellites having top three highest elevation angles are selected among the four normal satellites. Assuming that the error relating to the three satellites is zero, the following formula (24) is obtained. Specifically, three equations provided by the formula (24) are obtained.

$$0 = [0 \cdots 1 \cdots 0] \begin{bmatrix} e_{d1} \\ \vdots \\ e_{di} \\ \vdots \\ e_{dn} \end{bmatrix} \quad (24)$$

These equations are added to the constraint equation (23). Thus, the formula (25) as a new constraint equation is obtained.

$$\begin{bmatrix} e_{vh} \\ e_{vh1} \\ \vdots \\ e_{vhn} \\ 0 \\ \vdots \end{bmatrix} = \begin{bmatrix} c_1 & & c_n \\ 0 & \cdots & c_n \\ c_1 & & c_n \\ c_1 & & 0 \\ 0 & \cdots & 1 & \cdots & 0 \\ & \vdots & \end{bmatrix} \begin{bmatrix} e_{d1} \\ e_{d2} \\ \vdots \\ e_{dn} \end{bmatrix} \quad (25)$$

The above formula (19) is rewritten in a vector form, so that the formula (26) is obtained.

$$e_{vh} = Be_d \quad (26)$$

The Doppler shift error of each satellite is obtained from the formula (27) with using the least-square method.

$$e_d = B^+ e_{vh} \quad (27)$$

The observation error calculator 34 calculates a relation equation between the speed error in the height direction with respect to each combination of the satellites and the Doppler shift error of all satellites with respect to each of the combinations of four or more satellites based on the Doppler shift frequency obtained from the GPS receiver 12 and the speed error calculated by the altitude error calculator 30. Thus, the above formula (23) is obtained. Here, the combinations of the satellites include the combination of all satellites, from which the satellite signals are received, and the n combinations of the (n−1) satellites, which are obtained by removing one satellite from all satellite. The observation error calculator 34 calculates the relationship between the speed error in the height direction and the Doppler shifty error of all satellites with respect to three normal satellites, which has top three highest elevation angle and selected from four normal satellites, so that the formula (24) is obtained. The observation error calculator 34 obtains the formula (25), i.e., the formula (26), which is calculated from the formula (23) obtained with respect to each combination of the satellites and the formula (24) with respect to three normal satellites. Then, the observation error calculator 34 solves simultaneous equations shown as the formula (26) with using the formula (27), so that the Doppler shift error of all satellites is obtained.

The error correction and positioning calculator 36 calculates the position coordinates of the reception position, which is corrected, with using the pseudo distance of all satellites and the pseudo distance error obtained by the observation error calculator 34. For example, a weighting matrix such as the formula (28) is defined, and then, the weighting matrix is applied to the formula (7), so that the formula (29) is obtained. According to the formula (29), the position coordinates of the reception position are calculated with using the weighting least-square method.

$$w_{ii} = \begin{cases} 1/|e_i| & (|e_i| \geq 1) \\ 1 - \log(|e_i|) & (|e_i| < 1) \end{cases} \quad (28)$$

$$\Delta x = (H^T W H)^{-1} H^T W \Delta r \quad (29)$$

Here, $e_i$ represents the pseudo distance error of the i-th satellite. w represents the weighting matrix having the (i, i) component defined as $w_{ii}$.

The error correction and positioning calculator 36 calculates the speed of the GPS receiver 12, an error of which is corrected, with using the Doppler shift frequency of all satellites and the Doppler shift error calculated by the observation error calculator 34. For example, similar to the formula (28), the weighting matrix obtained from the Doppler shift error is defined, and then, the speed of the GPS receiver 12 is calculated with using the weighting least-square method.

Assuming that the Doppler shift amount is large when the pseudo distance error is large, the weighting matrix w shown in the formula (28) may be applied to the speed calculation.

The error correction and positioning calculator 36 outputs the position coordinates of the reception position and the speed of the GPS receiver 12 to an external device such as a positioning result display device, an in-vehicle controller and a sensor integrated device.

The function of the in-vehicle positioning device 10 will be explained.

Figure 2:
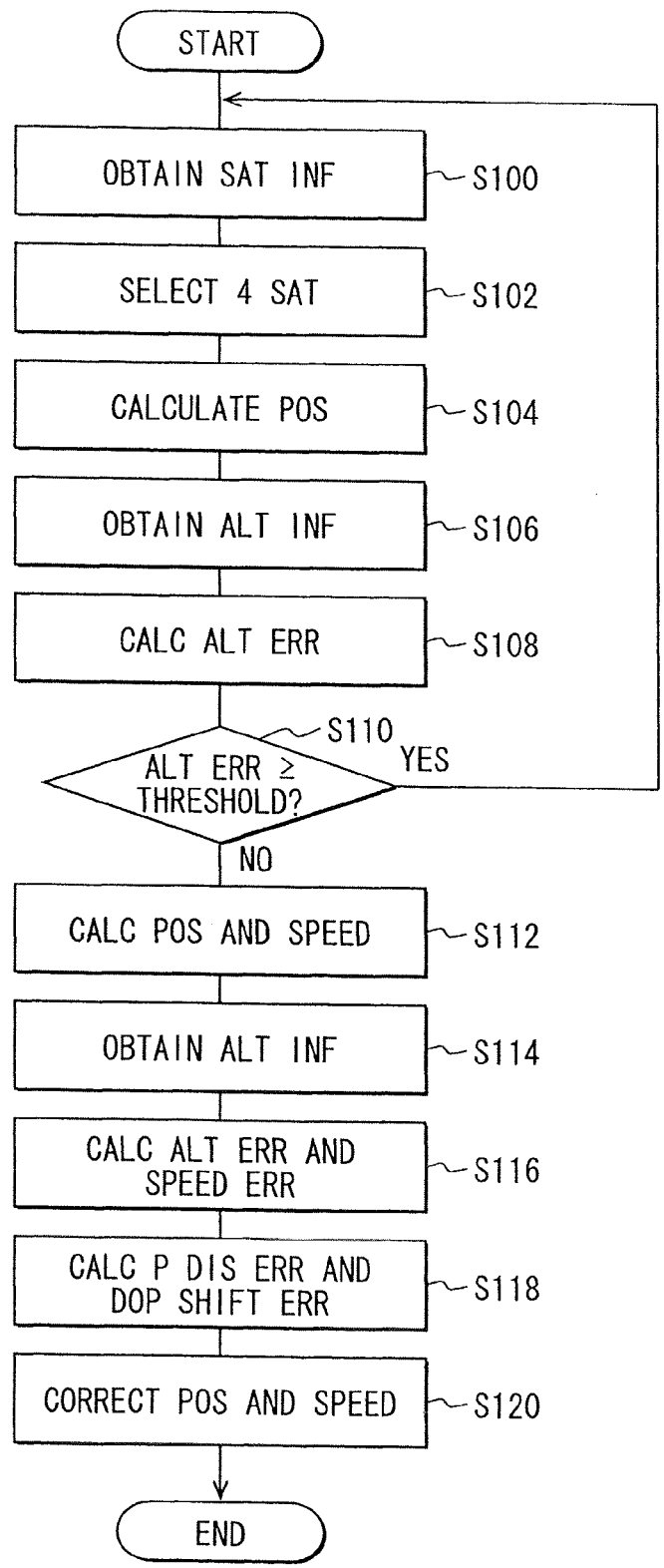
FIG. 2 is a flowchart showing a positioning process executed in the in-vehicle positioning apparatus according to the first embodiment.

When the receiving unit 18 of the GPS receiver 12 receives the electric wave from multiple positioning satellites, the computer 14 repeatedly executes the positioning process shown in FIG. 2.

In step S100, the computer 14 obtains the information about multiple satellites such as the pseudo distance, the Doppler shift frequency and the satellite elevation angle from the GPS receiver 12.

In step S102, based on the elevation angle of each satellite obtained in step S100, the computer 14 selects four satellites having high elevation angle. Next, in step S104, based on the pseudo distance of four satellites, the computer 14 calculates the reception position.

In step S106, the computer 14 obtains the altitude information corresponding to the reception position calculated in step S104 from the altitude map database 28. In step S108, the computer 14 calculates the altitude error based on the height component of the reception position calculated in step S104 and the altitude information obtained in step S106. Next, in step S110, the computer 14 determines whether the altitude error calculated in step S108 is equal to or larger than a predetermined threshold value. When the altitude error is equal to or lager than the threshold value, the computer 14 determines that four satellites are not proper. The process returns to step S100, and then, satellite information is newly obtained. When the altitude error is smaller than the threshold value, the computer 14 determines that four satellites are proper, and four satellites are set to be normal satellites. Then, it proceeds to step S112.

In step S112, the computer 14 calculates the reception position with respect to each combination of four or more satellites based on the pseudo distance obtained in step S100, and four or more satellites are selected from all satellites, from which the satellite information is obtained in step S100. Further, in step S112, the computer 14 calculates the speed of the GPS receiver 12 with respect to each combination of four or more satellites based on the Doppler shift frequency obtained in step S100. Here, the combination so four or more satellites includes the combination of all satellites and n combinations of (n−1) satellites.

In step S114, the computer 14 obtains the altitude information at the reception position with respect to each combination of four or more satellites from the altitude map database 28. In step S116, the computer 14 calculates the altitude error with respect to each combination of satellites based on the height component of the reception position calculated in step S112 and the altitude information obtained in step S114. Further, the computer 14 calculates the speed error in the height direction with respect to each combination of satellites based on the height component of the speed calculated in step S112 and the altitude information obtained in step S114.

Next, in step S118, the computer 14 calculates the relationship between the altitude error corresponding to the combination the and pseudo distance error of all satellites with respect to each combination based on the pseudo distance obtained in step S100 and the altitude error calculated in step S116. The computer 14 solves simultaneous equations of the relationship between the altitude error of three normal satellites and the pseudo distance error of all satellites and the relationship of each combination of satellites, the three satellites being selected to have high elevation angle from four normal satellites. Thus, the computer calculates the pseudo distance error of all satellites.

Further, the computer 14 obtains the relationship between the speed error in the height direction corresponding to the combination and the Doppler shift error of all satellites with respect to each combination of satellites, for example, each of the combination of all satellites and n combinations of (n−1) satellites based on the Doppler shift frequency obtained in step S100 and the speed error in the height direction calculated in step S116. The computer 14 solves simultaneous equations of the relationship between the speed error in the height direction with respect to three selected satellites having top three highest elevation angles among four satellites and the Doppler shift error of all satellites and the relationship of each combination of satellites. Thus, the computer 14 calculates the Doppler shift error of all satellites.

In step S120, the computer 14 calculates the reception position based on the pseudo distance obtained in step S100 and the pseudo distance error calculated in step S118. Further, the computer 14 calculates the speed of the GPS receiver 12 base on the Doppler shift frequency obtained in step S100 and the Doppler shift error calculated in step S118. Then, the computer 14 ends the positioning process.

In the in-vehicle positioning apparatus, simultaneous equations of the relationship between the altitude error corresponding to each combination and the pseudo distance error of multiple satellites and the relationship between the altitude error of selected satellites and the pseudo distance error of multiple satellites are solved so that the pseudo distance error of each satellite. The apparatus calculates the pseudo distance error accurately, and improves the positioning accuracy of the GPS. Further, the apparatus calculates the reception position accurately.

Further, the apparatus solves simultaneous equations of the relationship between the speed error in the height direction with respect to each combination and the Doppler shift error of multiple satellites and the relationship between the speed error in the height direction with respect to selected satellites and the Doppler shift error of multiple satellites so that the Doppler shift error of multiple satellites is calculated. Thus, the apparatus calculates the Doppler shift error accurately, and improves the positioning accuracy of the GPS. Further, the apparatus calculates the speed of the GPS receiver accurately.

With using the altitude map, the altitude error of the positioning result of the GPS may be calculated. This altitude error is derived from the pseudo distance error. Thus, based on the information of the elevation angle, the satellites are selected to have reliable information. The pseudo distance error of each satellite is reversely calculated based on the altitude error.

The accuracy of positioning may not be determined based on only the altitude information. This is because the variables are four, i.e., e, y, z and the clock, which are to be determined. Thus, the altitude information is not sufficient to solve four variables. Specifically, more three information are necessary. In the present embodiment, in addition to the altitude information, the normal satellites having reliable information are selected with using the elevation angle. To compensate insufficient information, the pseudo distance error of each satellite is accurately estimated.

(Second Embodiment)

Next, a second embodiment will be explained.

In the second embodiment, the pseudo distance error is provisionally calculated so that normal satellites are selected.

Figure 3:
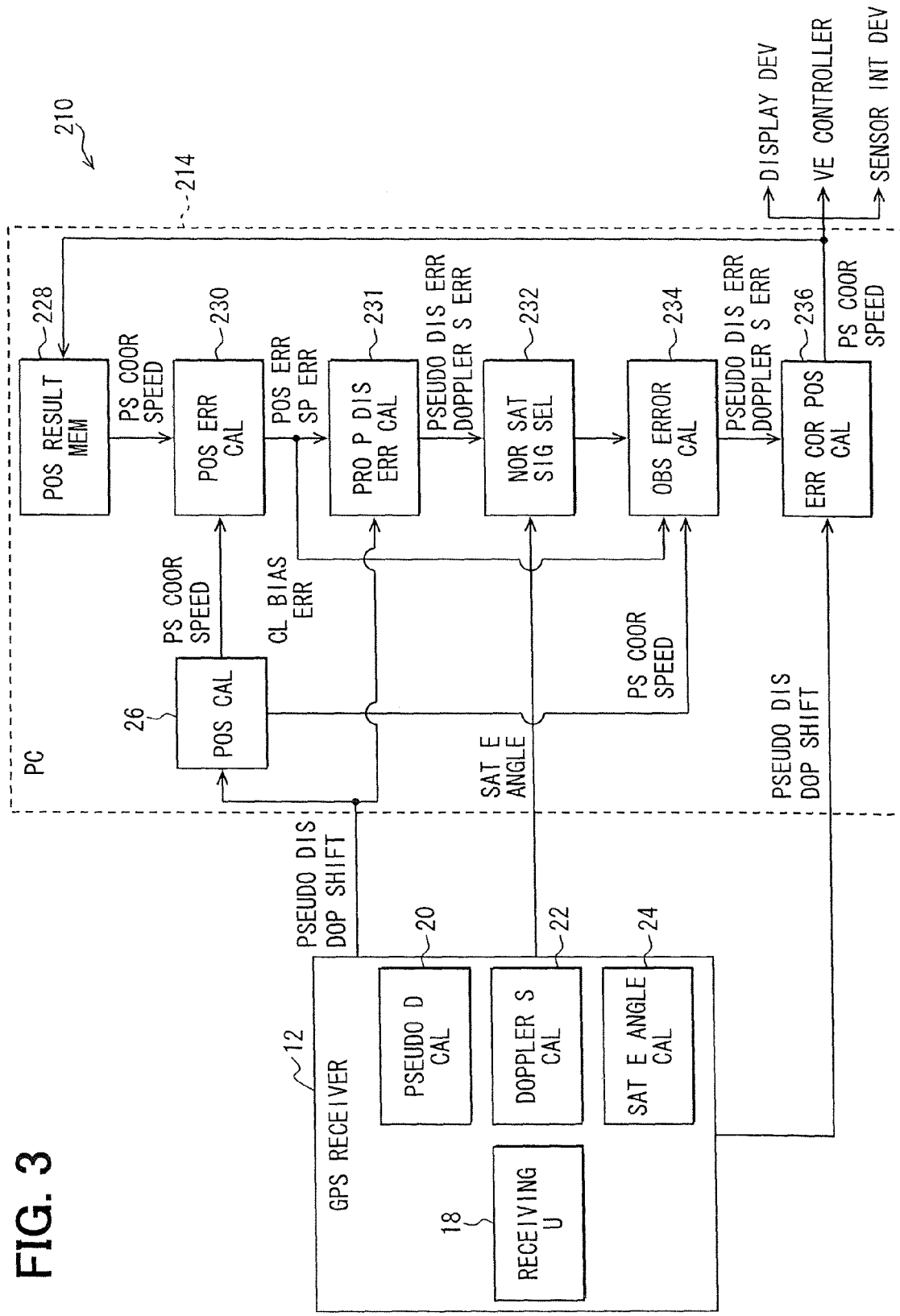
FIG. 3 is a block diagram showing an in-vehicle positioning apparatus according to a second embodiment.
Figure 4:
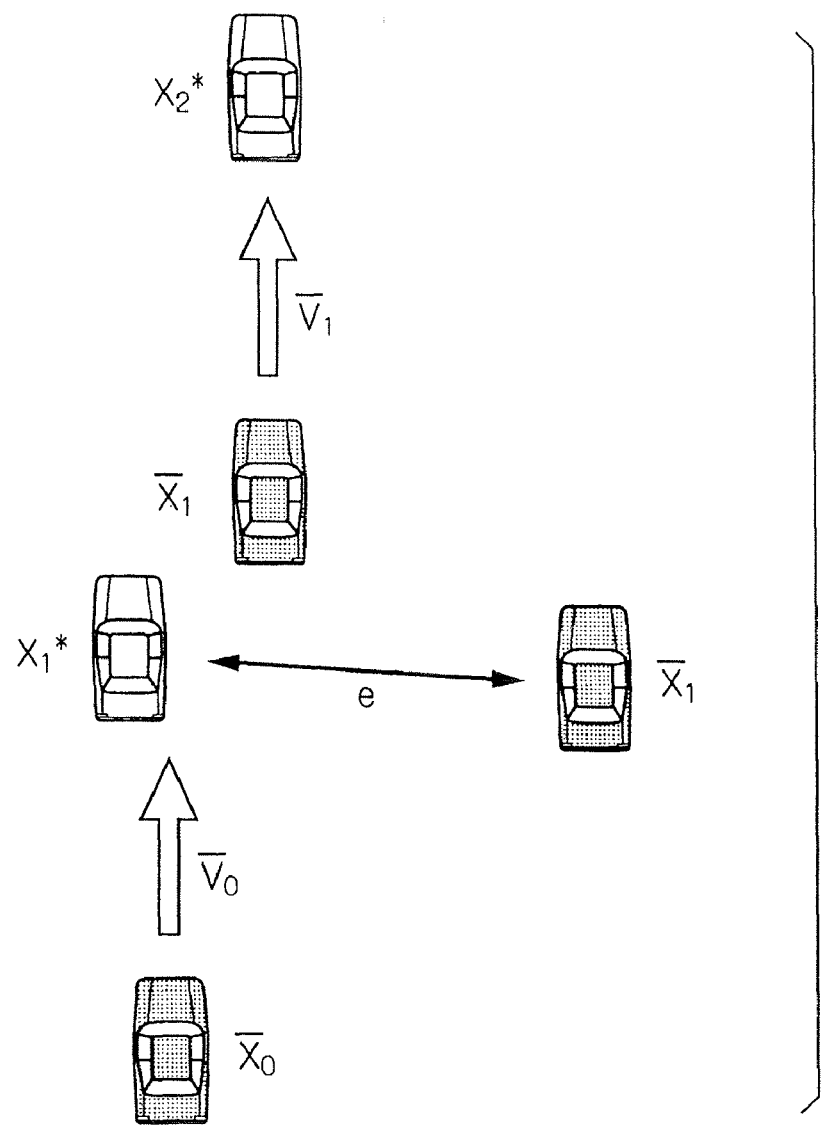
FIG. 4 is a diagram showing a method for calculating various errors in a position and a clock bias.

As shown in FIG. 3, a computer 214 in an in-vehicle positioning apparatus 210 includes a position calculator 26, a positioning result memory 228 for storing the position coordinates of the reception position and the speed of the GPS receiver 12, which are previously calculated, a positioning error calculator 230 for calculating the positioning error and the speed error based on the calculated position coordinates, and the calculated speed and the previously calculated position coordinates and the previously calculated speed, a provisional pseudo distance error calculator 231 for calculating the pseudo distance error and the Doppler shift error based on the pseudo distance and the Doppler shift frequency output from the GPS receiver 12 and the positioning error and the speed error calculated by the positioning error calculator 230, a normal satellite selector 232 for selecting at least three normal satellites based on the elevation angle output from the GPS receiver 12 and the pseudo distance error and the Doppler shift error calculated by the provisional pseudo distance error calculator 231, an observation error calculator 243 for calculating the pseudo distance error and the Doppler shift error based on the positioning error and the speed error calculated by the positioning error calculator 230 and the selected normal satellites, and an error correction and positioning calculator 36.

The positioning result memory 228 stores the previously calculated position coordinates of the reception position and the speed of the GPS receiver 12, which are previously calculated by the error correction and positioning calculator 36.

The positioning error calculator 230 calculates the standard position $x_k^*$ based on the position coordinates of the reception position and the speed of the GPS receiver 12, which are previously calculated. Further, the positioning error calculator 230 calculates each error ex of the reception position and the clock bias with using the following formula (30).

$$x_k^* = \bar{x}_{k-1} + \bar{v}_{k-1}\Delta t$$

$$e_x = x_k - x_k^* \tag{30}$$

Here, $\bar{x}$ and $\bar{v}$ represents the position coordinates of the reception position and the speed of the GPS receiver 12, which are calculated by the error correction and positioning calculator 36. An index k of $\bar{x}$ and $\bar{v}$ represents time, at which the position coordinates and the speed are detected.

Here, each of the error of the reception position and the error of the clock bias is one of example errors of a component of the calculation result of the reception position.

The positioning error calculator 230 calculates the speed error $e_v$ with using the formula (31) based on the speed $\bar{v}_{k-1}$ of the GPS receiver 12, which is previously calculated, assuming that the speed is constant, and the clock drift is constant. Here, the previously presented speed is defined as the standard speed $v_k^*$.

$$v_k^* = \bar{v}_{k-1}$$

$$e_v = v_k - v_k^* \tag{31}$$

The speed error is one example of the error of the component of the calculation results of the speed.

Next, a principle of provisionally calculating the pseudo distance error will be explained.

The pseudo distance error e of the satellite is calculated based on the obtained positioning error. Here, the position coordinates of the vehicle is calculated with using the formula (32) by the Newton Raphson method.

$$\Delta x = x - x_{ini}$$

$$\Delta r_i = r_i - |x_{ini} - x_i|$$

$$\Delta r = H\Delta x \tag{32}$$

Here, $x_{ini}$ represents the initial estimation value of the vehicle position, $x_i$ represents a position of the i-th satellite, ri represents a pseudo distance of the i-th satellite, which is corrected with respect to the delay of the ionization layer, the delay of the troposphere and a satellite clock bias. $\Delta r$ represents a vector expression of $\Delta r_i$. H represents a geometric matrix for characterizing the satellite arrangement. The value of $\Delta x$ is calculated by the formula (33) with using the least-square method.

$$\Delta x = H^+ \Delta r \tag{33}$$

Here, $H^+$ represents a pseudo inverse matrix of the geometric matrix H. When the pseudo distance includes the observation error e derived from the multipath effect, the estimation result of the position also includes an error. Thus, the observation error e as the pseudo distance error and the positioning error $e_x$ has the following relationship.

$$\Delta x + e_x = H^+(\Delta r + e)$$

$$\therefore e_x = H^+ e \quad (34)$$

The above formula is defined as an error relation equation. According to the error relation equation, the pseudo distance error e is calculated from the positioning error $e_x$.

When the error relation equation is expressed with components, the formula (35) is obtained.

$$\begin{bmatrix} e_x \\ e_y \\ e_h \\ e_b \end{bmatrix} = \begin{bmatrix} a_1 & & a_n \\ b_1 & & b_n \\ c_1 & \cdots & c_n \\ d_1 & & d_n \end{bmatrix} \begin{bmatrix} e_1 \\ e_2 \\ \vdots \\ e_n \end{bmatrix} \quad (35)$$

When the number of the satellites is n, with regard to the combination of all satellites and n combinations of (n−1) satellites, the positioning calculation is performed, so that the following formula (36) is obtained. Specifically, the formula (36) includes (n+1) equations with respect to the altitude direction. For example, when the information of the first satellite is removed, the formula (36) is obtained.

$$\begin{bmatrix} e_{x1} \\ e_{y1} \\ e_{h1} \\ e_{b1} \end{bmatrix} = \begin{bmatrix} 0 & a_2 & & a_n \\ 0 & b_2 & & b_n \\ 0 & c_2 & \cdots & c_n \\ 0 & d_2 & & d_n \end{bmatrix} \begin{bmatrix} e_1 \\ e_2 \\ \vdots \\ e_n \end{bmatrix} \quad (36)$$

The above formula (36) is formed with respect to each of (n+1) combinations, and then, the (n+1) equations are aligned vertically. Thus, the formula (37) is obtained.

$$\begin{bmatrix} e_x \\ e_y \\ e_h \\ e_b \\ \vdots \\ e_{xn} \\ e_{yn} \\ e_{hn} \\ e_{bn} \end{bmatrix} = \begin{bmatrix} a_1 & & a_2 \\ b_1 & \cdots & b_2 \\ c_1 & & c_2 \\ d_1 & & d_2 \\ \vdots & & \vdots \\ a_1 & & a_{n-1} & 0 \\ b_1 & \cdots & b_{n-1} & 0 \\ c_1 & & c_{n-1} & 0 \\ d_1 & & d_{n-1} & 0 \end{bmatrix} \begin{bmatrix} e_1 \\ e_2 \\ \vdots \\ e_n \end{bmatrix} \quad (37)$$

In the present embodiment, the above formula (37) is defined as a constraint equation. The constraint equation is rewritten in a vector form, so that the formula (38) is obtained.

$$e_x = Be \quad (38)$$

The pseudo distance error of each satellite is calculated by the formula (39) with using the least-square method.

$$e = B^+ e_x \quad (39)$$

In the present embodiment, the provisional pseudo distance error calculator 231 calculates a relation equation between the positioning error with respect to each combination of the satellites and the pseudo distance error of all satellites with respect to each of the combinations of four or more satellites based on the pseudo distance obtained from the GPS receiver 12 and the positioning error calculated by the positioning error calculator 230. Thus, the above formulas (35) and (36) are obtained. Here, the combinations of the satellites include the combination of all satellites, from which the satellite signals are received, and the n combinations of the (n−1) satellites, which are obtained by removing one satellite information from all satellite. The provisional pseudo distance error calculator 231 obtains the formula (37) based on the formulas (35) and (36). Further, the provisional pseudo distance error calculator 231 obtains the simultaneous equations shown as the formulas (37) and (38), and then, solves the simultaneous equations according to the formula (39), so that the provisional pseudo distance error calculator 231 calculates the pseudo distance error of all satellites.

Next, the principle of provisionally calculating the Doppler shift error will be explained.

The relationship between the speed error and the Doppler shift error is shown as the formula (22).

When the number of satellites is n, the positioning calculation with respect to the combination of all satellites and n combinations of (n−1) satellites is performed, so that the (n+1) equations are calculated, so that the formula (40) is obtained. Here, for example, when the first satellite information is removed, the formula (40) is obtained.

$$\begin{bmatrix} e_{vx1} \\ e_{vy1} \\ e_{vh1} \\ e_{vd1} \end{bmatrix} = \begin{bmatrix} 0 & a_2 & & a_n \\ 0 & b_2 & & b_n \\ 0 & c_2 & \cdots & c_n \\ 0 & d_2 & & d_n \end{bmatrix} \begin{bmatrix} e_{d1} \\ e_{d2} \\ \vdots \\ e_{dn} \end{bmatrix} \quad (40)$$

The formula (40) is formed with respect to each of (n+1) combinations, and then, the formulas are aligned vertically, so that the formula (41) is obtained.

$$\begin{bmatrix} e_{vx} \\ e_{vy} \\ e_{vh} \\ e_{vd} \\ \vdots \\ e_{vxn} \\ e_{vyn} \\ e_{vhn} \\ e_{vdn} \end{bmatrix} = \begin{bmatrix} a_1 & & a_2 \\ b_1 & \cdots & b_2 \\ c_1 & & c_2 \\ d_1 & & d_2 \\ \vdots & & \vdots \\ a_1 & & a_{n-1} & 0 \\ b_1 & \cdots & b_{n-1} & 0 \\ c_1 & & c_{n-1} & 0 \\ d_1 & & d_{n-1} & 0 \end{bmatrix} \begin{bmatrix} e_{d1} \\ e_{d2} \\ \vdots \\ e_{dn} \end{bmatrix} \quad (41)$$

In the present embodiment, the formula (41) is defined as a constraint equation. This constraint equation is rewritten in a vector form. Thus, the formula (42) is obtained.

$$e_v = B e_d \quad (42)$$

The Doppler shift error of each satellite is obtained with using the formula (43) by the least-square method.

$$e_d = B^+ e_v \quad (43)$$

The provisional pseudo distance error calculator 231 calculates a relation equation between the speed error with respect to each combination of the satellites and the Doppler shift error of all satellites with respect to each of the combinations of four or more satellites based on the Doppler shift frequency obtained from the GPS receiver 12 and the speed error calculated by the positioning error calculator 230. Thus, the above formulas (22) and (40) are obtained. Here, the combinations of the satellites include the combination of all satellites, from which the satellite signals are received, and the n combinations of the (n−1) satellites, which are obtained by removing one satellite from all satellite. The provisional pseudo distance error calculator 231 obtains the formula (41) based on the formulas (22) and (40). Further, the provisional pseudo distance error calculator 231 obtains the simultaneous equations shown as the formulas (41) and (42). The provisional pseudo distance error calculator 231 solves simultaneous equations according to the formula (43), so that the Doppler shift error of all satellites is obtained.

The normal satellite selector 232 selects three normal positioning satellites having top three highest elevation angles based on the elevation angle of the satellite output from the GPS receiver 12 while each of the three satellites has the pseudo distance error calculated by the provisional pseudo distance error calculator 231 equal to or smaller than the threshold value. When the normal satellite selector 232 cannot select three satellites, the normal satellite selector 232 determines that the three normal satellites are not obtained. Here, the pseudo distance error of the selected normal satellite is also proper. Alternatively, the normal satellite selector 232 may select three normal satellites having the pseudo distance error equal to smaller than the threshold value.

The normal satellite selector 232 selects, for example, three satellites having the elevation angles output from the GPS receiver 12, which are higher than other satellites, and the Doppler shift errors calculated by the provisional pseudo distance error calculator 231, which are equal to or smaller than the threshold value. When the selector 232 cannot select three satellites, the selector 232 determines that three satellites are not obtained. Here, the Doppler shift error of each of the selected three satellites is proper. Alternatively, the selector 232 may select more than three satellites having the Doppler shift error equal to or smaller than the threshold value.

Next, the principle of calculating the pseudo distance error e will be explained.

The provisional pseudo distance error calculator 231 assumes that the past information is proper reference, and the calculator 231 calculates the pseudo distance error based on the past information. Thus, when the vehicle runs in an urban area, the multipath effect may continue to affect for a long time. In this case, the past information to be reliable gets old, so that the past information may not be used for the proper reference. Thus, with using the positioning error obtained based on the past information and the current normal satellite information, the pseudo distance error e of the positioning satellite is calculated. Here, only the components of the fourth row in the formula (16) as the relation equation of the error are used for calculation. The fourth row relates to the clock bias, i.e., the clock error. Similar to the provisional pseudo distance error calculator 231, the (n+1) relation equations of the error of the clock bias are obtained with respect to (n+1) combinations of satellites. For example, the (n+1) combinations include the combination of all satellites, i.e., n satellites, and the n combinations of (n−1) satellites. Thus, the formula (44) as the constraint equation is obtained.

$$\begin{bmatrix} e_b \\ e_{b1} \\ \vdots \\ e_{bn} \end{bmatrix} = \begin{bmatrix} d_1 & & d_n \\ 0 & & d_n \\ \vdots & \cdots & \vdots \\ d_1 & & d_n \\ d_1 & & 0 \end{bmatrix} \begin{bmatrix} e_1 \\ e_2 \\ \vdots \\ e_n \end{bmatrix} \qquad (44)$$

Here, the unknown values are four values, i.e., the vector x=(x, y, h, b). Since only the clock bias information is used in the formula (44), the rank of the right side of the matrix of the formula (44) is (n−3). Thus, three more equations are necessary to solve the equation. Thus, the error of the pseudo distance error of each of three satellites is set to be zero, so that three equations shown in the formula (45) are obtained.

$$0 = \begin{bmatrix} 0 & \cdots & 1 & \cdots & 0 \end{bmatrix} \begin{bmatrix} e_1 \\ \vdots \\ e_i \\ \vdots \\ e_n \end{bmatrix} \qquad (45)$$

When the three equations shown in the formula (45) is added to the constraint equation (44), the new constraint equation shown as the formula (46) is obtained.

$$\begin{bmatrix} e_b \\ e_{b1} \\ \vdots \\ e_{bn} \\ 0 \\ \vdots \end{bmatrix} = \begin{bmatrix} d_1 & & d_n \\ 0 & \cdots & d_n \\ d_1 & & d_n \\ d_1 & & 0 \\ 0 & \cdots & 1 & \cdots & 0 \\ & \vdots & & \end{bmatrix} \begin{bmatrix} e_1 \\ e_2 \\ \vdots \\ e_n \end{bmatrix} \qquad (46)$$

The above equation is rewritten in a vector form, so that the formula (47) is obtained.

$$e_b = B_b e \qquad (47)$$

With using the least square method, the pseudo distance error of each satellite is obtained according to the formula (48).

$$e = B_b^+ e_b \qquad (48)$$

The observation error calculator 234 calculates a relation equation between the clock bias error with respect to each combination of the satellites and the pseudo distance error of all satellites with respect to each of the combinations of four or more satellites based on the pseudo distance obtained from the GPS receiver 12 and the clock bias component of the positioning error calculated by the positioning error calculator 230. Thus, the above formula (44) is obtained. Here, the combinations of the satellites include the combination of all satellites, from which the satellite signals are received, and the n combinations of the (n−1) satellites, which are obtained by removing one satellite from all satellite. Further, the observation error calculator 234 sets the predetermined relation equation shown as the formula (45) between the clock bias error and the pseudo distance error of all satellites with respect to three normal satellites having the proper pseudo distance error, which are selected by the normal satellite selector 232. The observation error calculator 234 obtains the simultaneous equations shown as the formulas (46) and (47), which includes the relation equation shown as the formula (44) with respect to each combination of satellites and the relation equation shown as the formula (45) with respect to the normal satellites. The calculator 234 solves the simultaneous equations according to the formula (48). Thus, the calculator 234 calculates the pseudo distance error of all satellites.

Next, the principle of calculating the Doppler shift error $e_d$ will be explained.

In the calculation of the Doppler shift error by the provisional pseudo distance error calculator 231, the calculator 231 assumes that the past information is proper reference, and the calculator 231 calculates the Doppler shift error based on the past information. Thus, when the vehicle runs in an urban area, the multipath effect may continue to affect for a long time. In this case, the past information to be reliable gets old, so that the past information may not be used for the proper reference. Thus, with using the current normal satellite information, the Doppler shift error $e_d$ of the positioning satellite is calculated again. Here, only the components of the third row in the error related equation are used for calculation. The third row relates to the speed in the height direction. The (n+1) relation equations of the speed error in the height direction are obtained with respect to (n+1) combinations of satellites. For example, the (n+1) combinations include the combination of all satellites, i.e., n satellites, and the n combinations of (n−1) satellites. Thus, the formula (49) as the constraint equation is obtained.

$$\begin{bmatrix} e_{vh} \\ e_{vh1} \\ \vdots \\ e_{vhn} \end{bmatrix} = \begin{bmatrix} d_1 & & d_n \\ 0 & & d_n \\ \vdots & \cdots & \vdots \\ d_1 & & d_n \\ d_1 & & 0 \end{bmatrix} \begin{bmatrix} e_{d1} \\ e_{d2} \\ \vdots \\ e_{dn} \end{bmatrix} \quad (49)$$

In the formula (49), unknown values are four, i.e., x=(x, y, h, b). Since only the altitude information is used in the constraint equation, the rank of the right side matrix is (n−3). Thus, three more equations are necessary to solve the equation. Thus, the Doppler shift errors of three satellites having top three highest elevation angles are set to be zero, so that the following formula (50) is obtained. Specifically, three equations provided by the formula (50) are obtained.

$$0 = \begin{bmatrix} 0 & \cdots & 1 & \cdots & 0 \end{bmatrix} \begin{bmatrix} e_{d1} \\ \vdots \\ e_{di} \\ \vdots \\ e_{dn} \end{bmatrix} \quad (50)$$

The formula (50) is added to the constraint equation (49), so that the new constraint equation similar to the formula (25) is obtained. When the new constraint equation is rewritten in a vector form, the formula similar to the formula (26) is obtained.

The Doppler shift error of each satellite is obtained according to the formula similar to the formula (27) by the least square method.

The observation error calculator 234 according to the present embodiment calculates a relation equation between the speed error in the height direction with respect to each combination of the satellites and the Doppler shift error of all satellites with respect to each of the combinations of four or more satellites based on the Doppler shift frequency obtained from the GPS receiver 12 and the component of the speed error in the height direction calculated by the positioning error calculator 230. Thus, the above formula (49) is obtained. Here, the combinations of the satellites include the combination of all satellites, from which the satellite signals are received, and the n combinations of the (n−1) satellites, which are obtained by removing one satellite from all satellite. Further, the observation error calculator 234 forms the predetermined relation equation between the speed error in the height direction and the Doppler shift error of all satellites with respect to three normal satellites having proper Doppler shift error, which are selected by the normal satellite selector 232. The observation error calculator 234 obtains simultaneous equations similar to the formulas (25) and (26), which include the relation equation shown as the formula (49) with respect to each combination and the relation equation shown as the formula (50) with respect to the Doppler shift error of the normal satellite. Similar to the formula (27), the observation error calculator 234 solves the simultaneous equations, so that the Doppler shift error of all satellites is calculated.

Figure 5:
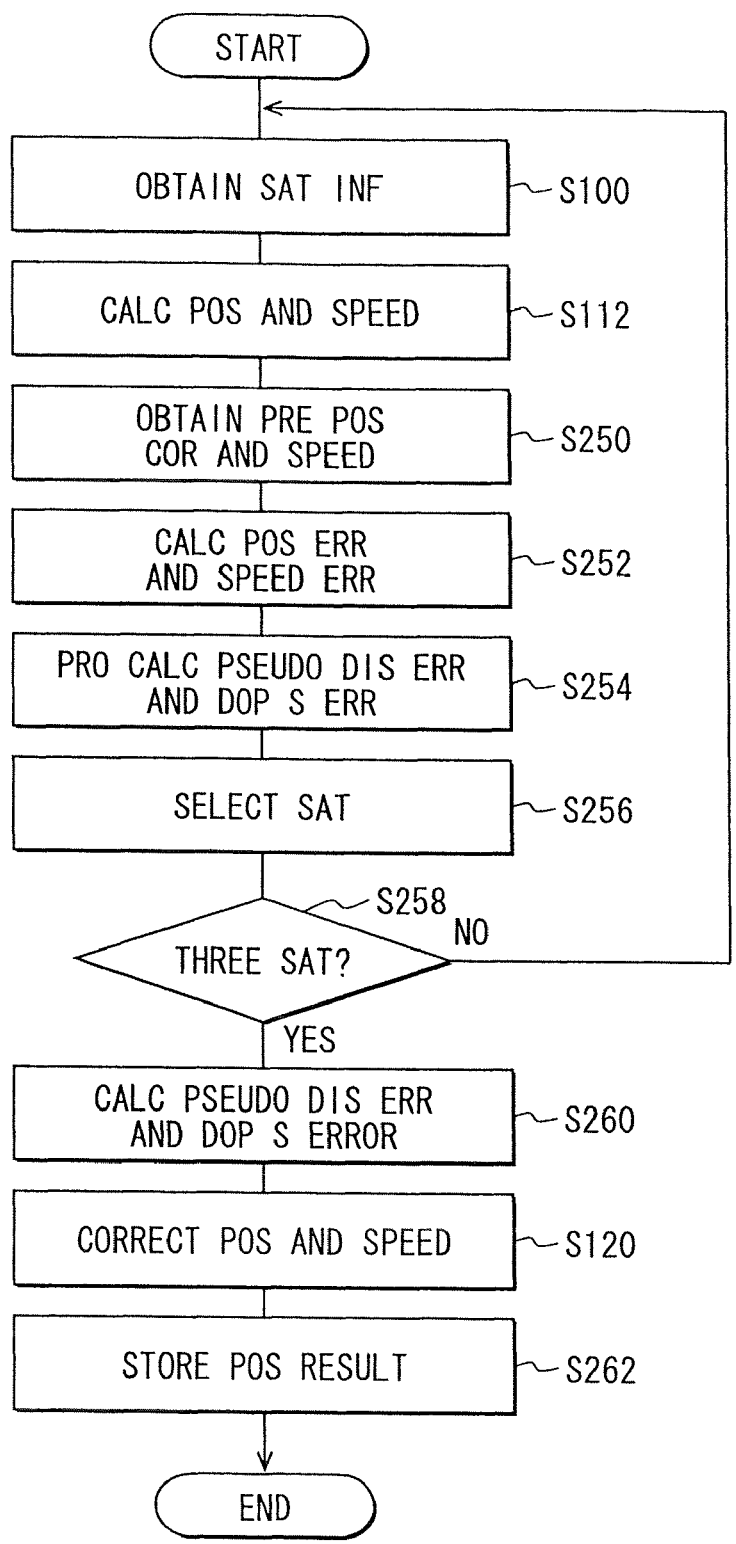
FIG. 5 is a flowchart showing a positioning process executed in the in-vehicle positioning apparatus according to the second embodiment.

The positioning process according to the present embodiment will be explained with reference to FIG. 5.

In step S100, the information of multiple satellites such as the pseudo distance, the Doppler shift frequency and the elevation angle is obtained from the GPS receiver 12.

In step S112, the reception position with respect to each combination of four or more satellites among all satellites, from which the information is received in step S100, is calculated based on the pseudo distance obtained in step S100. Here, the combinations of four or more satellites include the combination of all satellites and the n combinations of (n−1) satellites. Further, the speed of the GPS receiver 12 is calculated based on the Doppler shift frequency obtained in step S100.

In step S250, the previously stored position coordinates of the reception position and the previously stored speed of the GPS receiver 12 are obtained. In step S252, the positioning error of the reception position and the speed error are calculated based on the reception position and the speed calculated in step S112 and the previous reception position and the previous speed obtained in step S250.

In step S254, the relation equation with respect to each combination between the positioning error with respect to a corresponding combination and the pseudo distance error of all satellites is obtained based on the pseudo distance obtained in step S100 and the positioning error calculated in step S252. The simultaneous equations including the above relation equations are solved, so that the pseudo distance error of all satellites is provisionally calculated.

Further, the relation equation with respect to each combination between the speed error of a corresponding combination and the Doppler shift error of all satellites is obtained based on the Doppler shift frequency obtained in step S100 and the speed error calculated in step S252. The simultaneous equations including the relation equations are solved, so that the Doppler shift error of all satellites is calculated.

In step S256, based on the elevation angle of each satellite obtained in step S100, for example, three satellites having the pseudo distance error provisionally calculated in step S254 equal to or smaller than the threshold value are selected in descending order according to the elevation angle. Further, for example, three satellites having the Doppler shift error provisionally calculated in step S254 equal to or smaller than the threshold value are selected in descending order according to the elevation angle.

In step S258, it is determined whether three satellites with respect to the pseudo distance error and three satellites with respect to the Doppler shift error are selected in step S256. When three satellites with respect to the pseudo distance error and three satellites with respect to the Doppler shift error are not selected in step S256, it is determined that no normal satellite is found. Then, it returns to step S100, so that the satellite information is newly obtained. When three satellites with respect to the pseudo distance error and three satellites with respect to the Doppler shift error are selected in step S256, it is determined that the normal satellites are found. Then, it goes to step S260.

In step S260, the relation equation between the clock bias error of each combination and the pseudo distance error of all satellites with respect to a corresponding combination of satellites based on the pseudo distance obtained in step S100 and the clock bias component of the positioning error calculated in step S252. Here, the combinations include the combination of all satellites and the n combinations of the (n−1) satellites. The simultaneous equations comprising the relation equation between the clock bias error of three normal satellites selected in view of the pseudo distance error and the pseudo distance error of all satellites and the relation equation of each combination of satellites are solved so that the pseudo distance error of all satellites is obtained.

Further, based on the Doppler shift frequency obtained in step S100 and the height direction component of the speed error calculated in step S252, the relation equation between the speed error in the height direction with respect to each combination and the Doppler shift error of all satellites is obtained. The simultaneous equations including the relation equation between the speed error in the height direction with respect to three normal satellites selected in view of the Doppler shift error and the Doppler shift error of all satellites and the relation equation of each combination of satellites is solved so that the Doppler shift error of all satellites is calculated.

In step S120, based on the pseudo distance obtained in step S100 and the pseudo distance error calculated in step S260, the reception position is calculated. Further, based on the Doppler shift error calculated in step S260 and the Doppler shift frequency obtained in step S100, the speed of the GPS receiver 12 is calculated.

In step S262, the reception position and the speed calculated in step S120 are stored in the positioning result memory 228. Thus, the positioning process ends.

In the in-vehicle positioning apparatus, the simultaneous equations including the relation equation between a certain component error of the calculation result of the position based on the pseudo distance with respect to each combination and the pseudo distance error of multiple satellites and the relation equation of selected normal satellites is solved, so that the pseudo distance error of each combination of satellites is calculated. Thus, the pseudo distance error is accurately calculated, and the positioning accuracy of the GPS is improved. Thus, the reception position is accurately calculated.

Further, the simultaneous equations including the relation equation between the component error of the calculation result of the speed based on the Doppler shift with respect to each combination and the Doppler shift error of multiple satellites and the relation equation of selected normal satellites is solved. Thus, the Doppler shift error of each combination of satellites is calculated. Thus, the Doppler shift error is accurately calculated, and the positioning accuracy of the GPS is improved. Thus, the speed of the GPS receiver is accurately calculated.

The past positioning result of the GPS and the current positioning result may be compared with each other so that the positioning error is obtained. Since this positioning error is derived from the pseudo distance error, in the present embodiment, the pseudo distance error of each satellite is reversely calculated based on the positioning error.

When the vehicle is disposed in the urban area, in which the multipath effect continues for a long time, the current information of the GPS observation should be used for estimating the pseudo distance error. In the present embodiment, with using the current GPS observation information, the pseudo distance error and the Doppler shift error are accurately estimated.

In the present embodiment, the relation equation with respect to the clock component is formed, so that the simultaneous equations are obtained. Alternatively, the relation equation with respect to another component may be formed so that the simultaneous equations are obtained. Alternatively, the relation equations with respect to multiple components may be formed so that the simultaneous equations are obtained. Preferably, since the temporal variation of the time error is small, the relation equation with respect to a time component may be formed so that the simultaneous equations are obtained.

(Third Embodiment)

A third embodiment will be explained.

In the present embodiment, after the three normal satellites are selected, the pseudo distance error is calculated based on the altitude map and the normal satellites.

Figure 6:
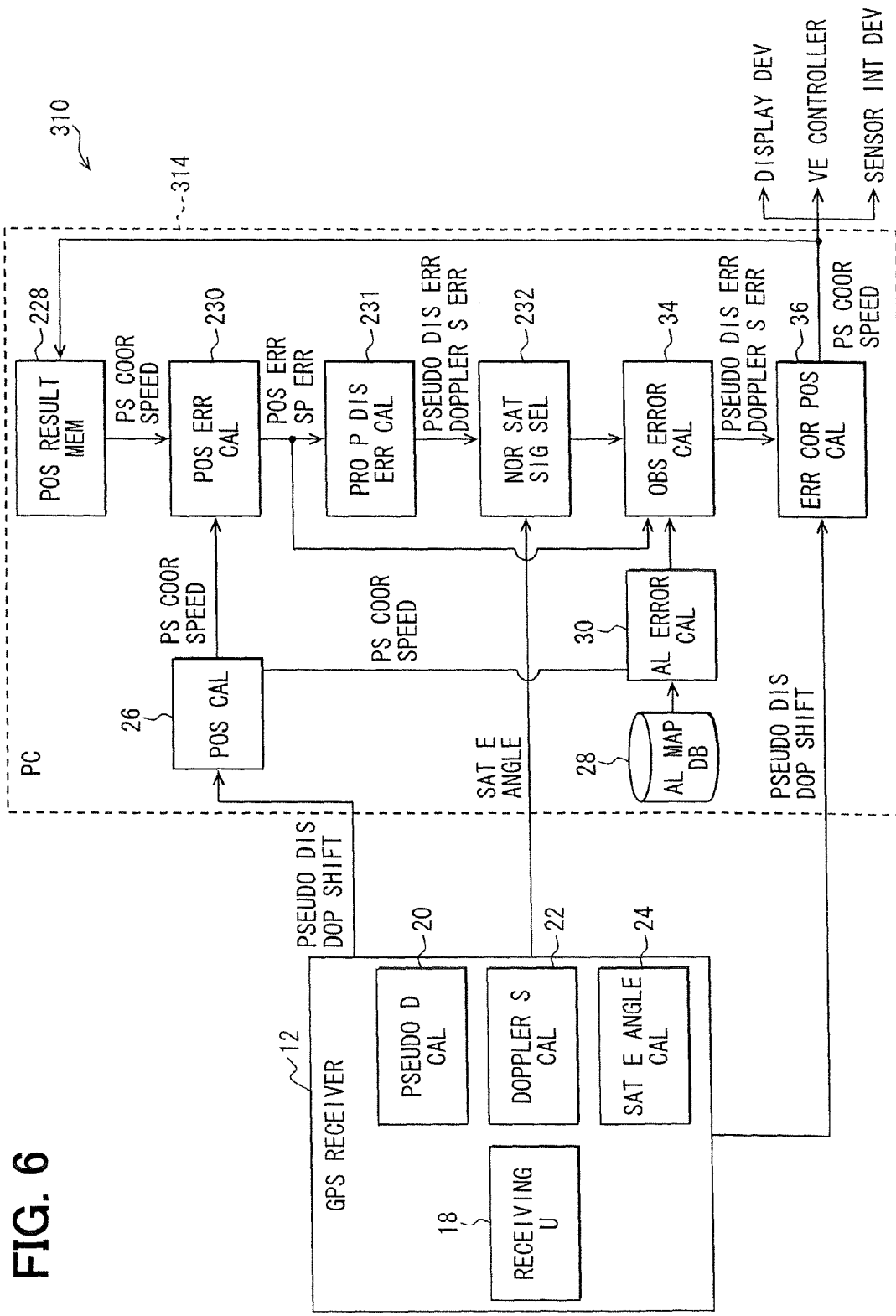
FIG. 6 is a block diagram showing an in-vehicle positioning apparatus according to a third embodiment.
Figure 7:
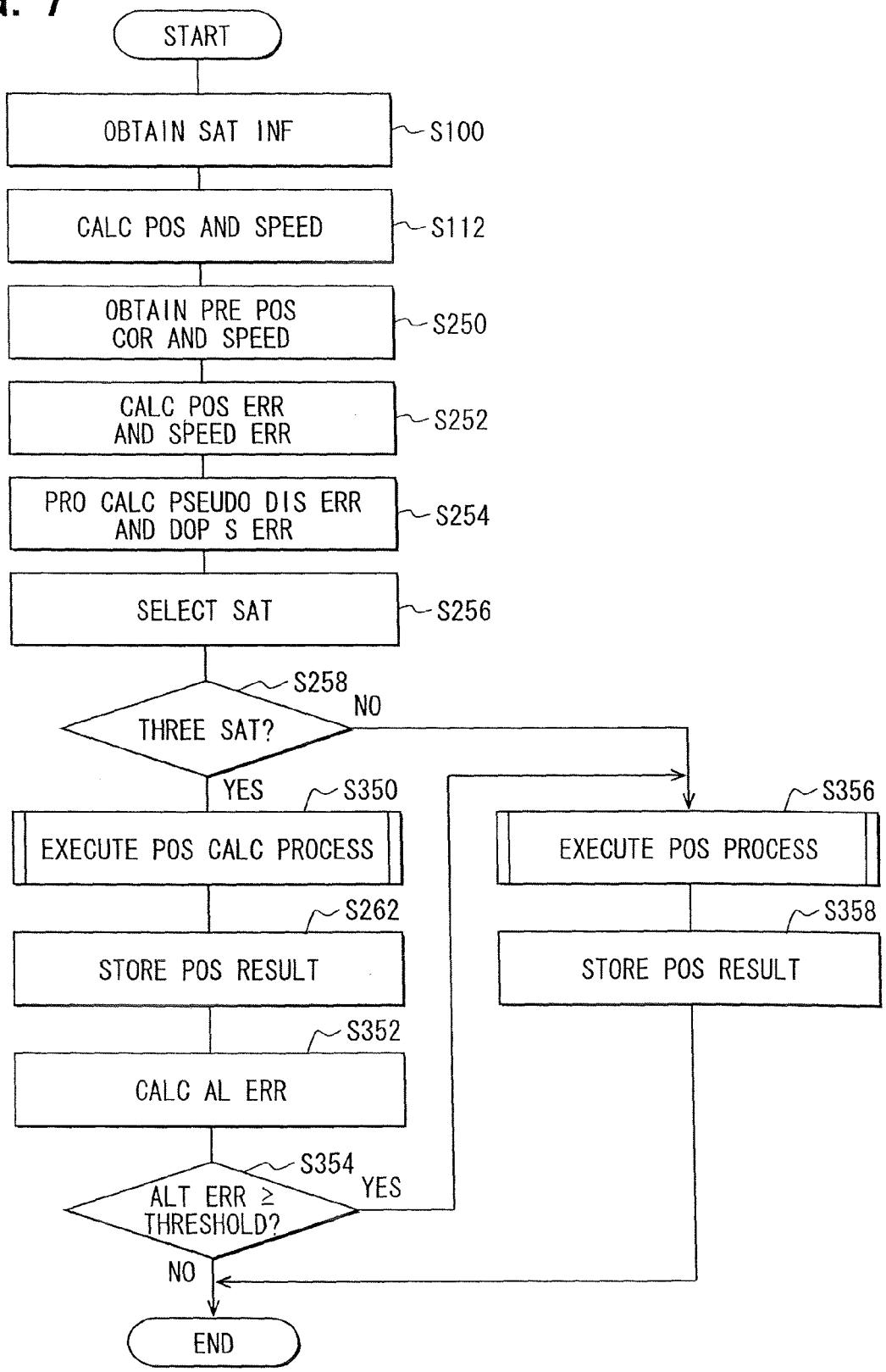
FIG. 7 is a flowchart showing a positioning process executed in the in-vehicle positioning apparatus according to the third embodiment.

As shown in FIG. 6, a computer 314 of an in-vehicle positioning apparatus 310 includes a positioning calculator 26, a positioning result memory 228, a positioning error calculator 230, a provisional pseudo distance error calculator 231, a normal satellite selector 232, an altitude map database 28, an altitude error calculator 30, an observation error calculator 34 and an error correction and positioning calculator 36.

The observation error calculator 34 obtains the relation equation between the altitude error with respect to each combination and the pseudo distance error of all satellites with respect to a corresponding combination of four or more satellites based on the pseudo distance obtained from the GPS receiver 12 and the altitude error calculated by the altitude error calculator 30. The combinations include the combination of all satellites, from which the satellite signals are received, and the n combinations of the (n−1) satellites, which are obtained by removing one satellite from all satellite. Thus, the calculator 34 obtains the formula (17). Further, the observation error calculator 34 forms the relation equation between the altitude error and the pseudo distance error of all satellites with respect to three satellites selected by the normal satellite selector 232 in view of the pseudo distance error so that the formula (18) is obtained. The observation error calculator 34 obtains the simultaneous equations shown as the formulas (19) and (20), which include the relation equation shown as the formula (17) obtained with respect to each combination the relation equation shown as the formula (18) with respect to three normal satellites. The, the simultaneous equations are solved according to the formula (21). Thus, the pseudo distance error of all satellites is calculated.

The observation error calculator 34 obtains the relation equation between the speed error in the height direction with respect to each combination of satellites and the Doppler shift error of all satellites with respect to a corresponding combination of four or more satellites based on the Doppler shift frequency obtained from the GPS receiver 12 and the speed error in the height direction calculated by the altitude error calculator 30 so that the formula (23) is obtained. The combinations include the combination of all satellites, from which the satellite signals are received, and the n combinations of the (n−1) satellites, which are obtained by removing one satellite from all satellite. Further, the observation error calculator 34 obtains the predetermined relation equation between the speed error in the height direction and the Doppler shift error of al satellites with respect to three normal satellites selected by the normal satellite selector 232 in view of the Doppler shift error so that the formula (24) is obtained. The observation error calculator 34 obtains the simultaneous equations shown as the formulas (25) and (26), which include the relation equation shown as the formula (23) with respect to each combination of satellites and the relation equation shown as the formula (24) with respect to the normal satellites. According to the formula (27), the simultaneous equations are solved, so that the Doppler shift error of all satellites is calculated.

The positioning process according to the third embodiment will be explained.

In step S100, the information of multiple satellites such as the pseudo distance, the Doppler shift frequency and the elevation angle is obtained from the GPS receiver 12. In step S112, the reception position with respect to each combination of four or more satellites among all satellites is calculated. Here, the combinations of four or more satellites include the combination of all satellites and the n combinations of (n−1) satellites. Further, the speed of the GPS receiver 12 is calculated.

In step S250, the previously stored position coordinates of the reception position and the previously stored speed of the GPS receiver 12 are obtained. The position coordinates and the speed are previously stored in step S262 and/or S358. In step S252, the positioning error of the reception position and the speed error are calculated based on the reception position and the speed calculated in step S112 and the previous reception position and the previous speed obtained in step S250.

In step S254, the pseudo distance error of all satellites is provisionally calculated, and further, the Doppler shift error of all satellites is also provisionally calculated.

In step S256, three normal satellites are selected in view of the pseudo distance error, and further, the three normal satellites are also selected in view of the Doppler shift error.

In step S258, it is determined whether the normal satellites in view of the pseudo distance error and the normal satellites in view of the Doppler. shift error are selected in step S256. When three normal satellites in view of the pseudo distance error and three normal satellites in view of the Doppler shift error are not selected in step S256, it is determined that the normal satellites are not obtained. Then, it goes to step S356. When three normal satellites in view of the pseudo distance error and three normal satellites in view of the Doppler shift error are selected in step S256, it is determined that the normal satellites are obtained. Then, it goes to step S350.

In step S350, similar to the first embodiment, the pseudo distance error and the Doppler shift error are calculated with using the altitude map, and further, the position calculation process and the speed calculation process are executed. Step S350 is performed by executing steps S114, S116, S118 and S120. In step S114, the position calculation process result and the speed calculation process result may be used.

In step S262, the reception position and the speed calculated in step S350 are stored in the positioning result memory 228. In step S352, the altitude information corresponding to the reception position calculated in step S350 is obtained from the altitude map database 28. Then, based on the height component of the reception position calculated in step S350 and the altitude information obtained in step S352, the altitude error is calculated.

In step S354, it is determined whether the altitude error calculated in step S352 is equal to or larger than a predetermined threshold value. When the altitude error is equal to or larger than the predetermined threshold value, it is determined that the positioning result is not proper. Then, it goes to step S356. When the altitude error is smaller than the predetermined threshold value, it is determined that the positioning result is proper. Then, the positioning process ends.

In step S356, similar to the first embodiment, the satellite information is obtained, the normal satellites are selected with using the altitude map, the pseudo distance error and the Doppler shift error are calculated with using the altitude map, and the positioning calculation process and the speed calculation process are performed with correcting the error. Step. S356 is performed by executing the positioning process according to the first embodiment.

In step S358, the reception position and the speed calculated in step S356 are stored in the positioning result memory 228. Then, the positioning process ends.

In the in-vehicle positioning apparatus, only when the three or more normal satellites are obtained, and the altitude error after correction is small, the normal satellites previously used for the positioning information are selected.

(Fourth Embodiment)

A fourth embodiment will be explained.

In the fourth embodiment, when the normal satellites are not obtained from four satellites having a high elevation angle, the normal satellites are selected with using the previous positioning information.

Figure 8:
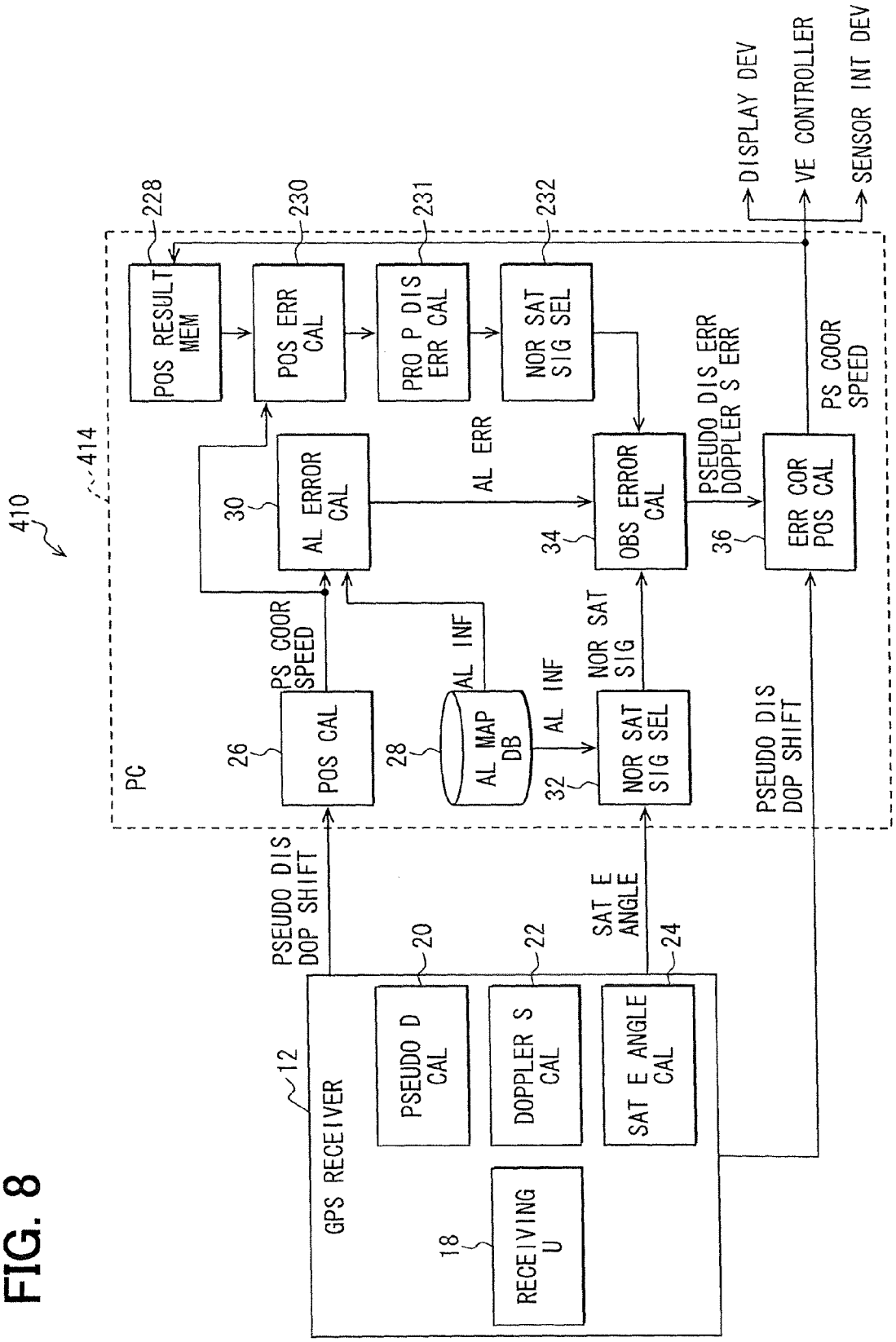
FIG. 8 is a block diagram showing an in-vehicle positioning apparatus according to a fourth embodiment.

As shown in FIG. 8, a computer 414 of an in-vehicle positioning apparatus 410 according to the fourth embodiment includes a positioning calculator 26, an altitude map database 28, an altitude error calculator 30, a normal satellite selector 32, an observation error calculator 34, a positioning result memory 228, a positioning error calculator 230, a provisional pseudo distance error calculator 231, a normal satellite selector 232, and an error correction and positioning calculator 36.

When four normal satellites are selected by the normal satellite selector 32, the observation error calculator 34 calculates the pseudo distance error of all satellites with using three normal satellites, which are selected among four normal satellites in descending order according to the elevation angle. Further, the observation error calculator 34 calculates the Doppler shift error of all satellites.

When four normal satellites are not selected by the normal satellite selector 32, and three normal satellites are selected by the normal satellite selector 232, the observation error calculator 34 calculates the pseudo distance error of all satellites with using three normal satellites, which are selected by the normal satellite selector 232. Further, the observation error calculator 34 calculates the Doppler shift error of all satellites.

Figure 9:
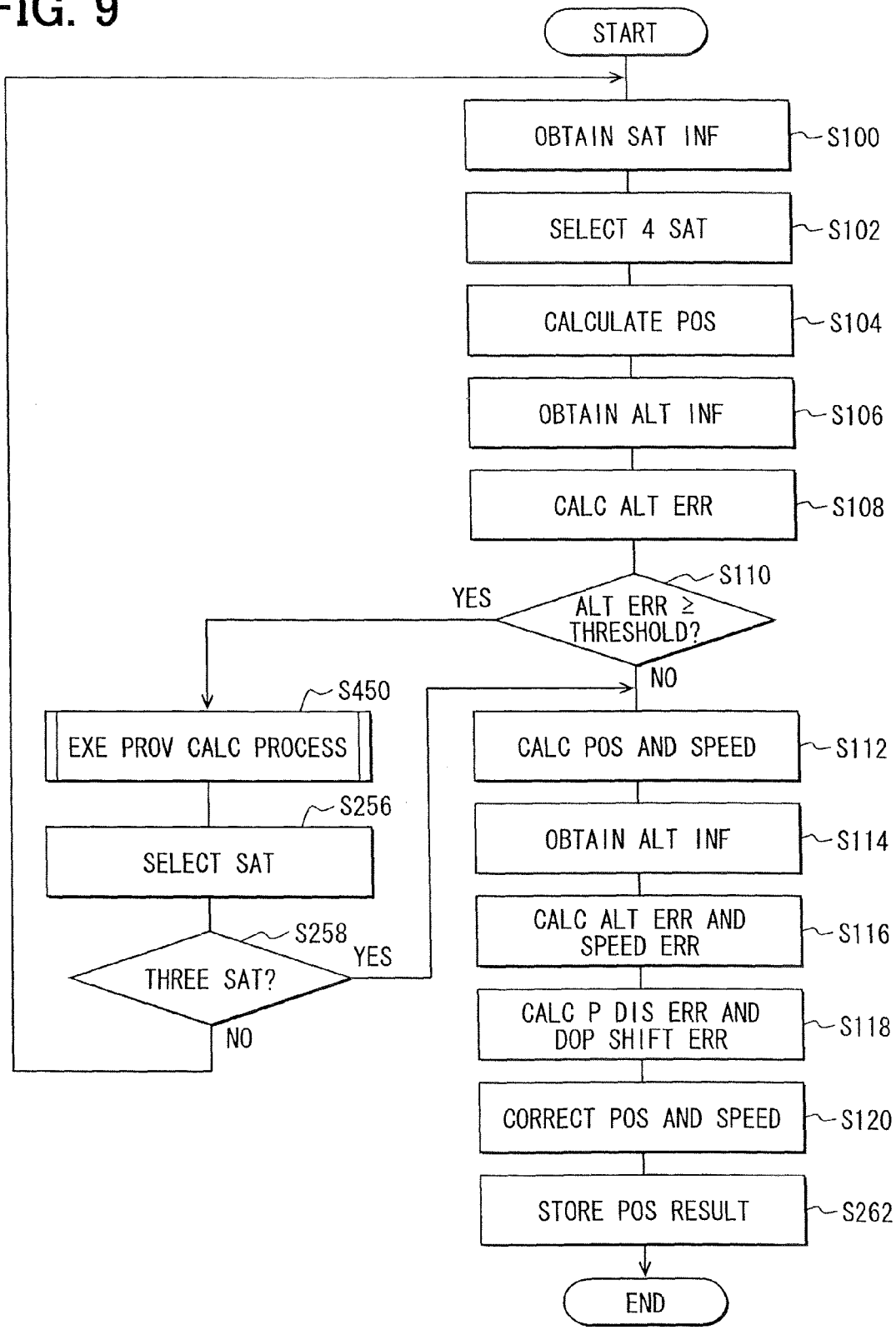
FIG. 9 is a flowchart showing a positioning process executed in the in-vehicle positioning apparatus according to the fourth embodiment.

The positioning process according to the fourth embodiment will be explained with reference to FIG. 9.

In step S100, the information of multiple satellites such as the pseudo distance, the Doppler shift frequency and the elevation angle is obtained from the GPS receiver 12. In step S102, the computer 414 selects four satellites having high elevation angle. Next, in step S104, based on the pseudo distance of four satellites, the computer 414 calculates the reception position.

In step S106, the computer 414 obtains the altitude information corresponding to the reception position calculated in step S104 from the altitude map database 28. In step S108, the computer 414 calculates the altitude error based on the height component of the reception position calculated in step S104 and the altitude information obtained in step S106. Next, in step S110, the computer 414 determines whether the altitude error calculated in step S108 is equal to or larger than a predetermined threshold value. When the altitude error is equal to or lager than the threshold value, the computer 414 determines that four satellites are not proper. The process proceeds to step S450. When the altitude error is smaller than the threshold value, the computer 414 determines that four satellites are proper, and four satellites are set to be normal satellites. Then, it proceeds to step S112.

In step S450, similar to the second embodiment, the pseudo distance error and the Doppler shift error are provisionally calculated with using the previous positioning result. Step S450 is performed by executing steps S112, S250, S252 and S254 according to the second embodiment.

In step S256, three satellites having the pseudo distance error provisionally calculated in step S450 equal to or smaller than the threshold value are selected as the normal satellites with respect to the pseudo distance error in descending order according to the elevation angle. Further, three satellites having the Doppler shift error provisionally calculated in step S450 equal to or smaller than the threshold value are selected as the normal satellites with respect to the Doppler shift error.

In step S258, it is determined whether three satellites with respect to the pseudo distance error and three satellites with respect to the Doppler shift error are selected in step S256. When three satellites with respect to the pseudo distance error and three satellites with respect to the Doppler shift error are not selected in step S256, it is determined that no normal satellite is found. Then, it returns to step S100, so that the satellite information is newly obtained. When three satellites with respect to the pseudo distance error and three satellites with respect to the Doppler shift error are selected in step S256, it is determined that the normal satellites are found. Then, it goes to step S112.

In step S112, the reception position with respect to each combination of four or more satellites among all satellites, from which the information is received in step S100, is calculated based on the pseudo distance obtained in step S100. Here, the combinations of four or more satellites include the combination of all satellites and the n combinations of (n−1) satellites. Further, the speed of the GPS receiver 12 is calculated based on the Doppler shift frequency obtained in step S100.

In step S114, the computer 414 obtains the altitude information at the reception position calculated in step S112 with respect to each combination from the altitude map database 28. In step S116, the computer 414 calculates the altitude error with respect to each combination. Further, the computer 414 calculates the speed error in the height direction.

In step S118, the pseudo distance error of all satellites and the Doppler shift error of all satellites are calculated with using information from three normal satellites, which are selected in step S258, or using information from three normal satellites selected in a descending order according to the elevation angle among four normal satellites selected in step S110.

In step S120, based on the pseudo distance obtained in step S100 and the pseudo distance error calculated in step S118, the reception position is calculated. Further, based on the Doppler shift frequency obtained in step S100 and the Doppler shift error calculated in step S118, the speed of the GPS receiver 12 is calculated. Next, in step S252, the reception position and the speed of the GPS receiver 12 calculated in step S120 are stored in the positioning result memory 228. Then, the positioning process ends.

In the in-vehicle positioning apparatus, as long as the altitude error obtained with using four satellites having high elevation angles is small, four satellites are selected as the normal satellites. When the normal satellites are not obtained from four satellites having high elevation angles, the normal satellites are selected based on the previous positioning information.

In the first to fourth embodiments, a predetermined relation equation is formed with respect to three normal satellites, and the predetermined relation equation is added to the simultaneous equations. Alternatively, a predetermined relation equation may be formed with respect to at least one normal satellite, and the predetermined relation equation is added to the simultaneous equations. In this case, at least one normal satellite is selected.

In the above embodiments, the pseudo distance error and the Doppler shift error are both calculated, so that the reception position and the speed are corrected. Alternatively, only the pseudo distance error may be calculated, so that only the reception position is corrected. Alternatively, only the Doppler shift error may be calculated, so that only the speed is corrected.

Alternatively, instead of the pseudo distance data, the GPS electric wave propagation time may be used for executing various processes.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A positioning apparatus comprising:
a first positioning device configured to calculate a reception position of a GPS receiver with respect to each possible combination of a plurality of positioning satellites selected from a group of positioning satellites based on a pseudo distance from each positioning satellite to the reception position, wherein the GPS receiver calculates the pseudo distance based on a satellite signal transmitted from a corresponding satellite and outputs the pseudo distance to the first positioning device;
a component error calculator configured to calculate an error of at least one component in a calculation result of the first positioning device with respect to each possible combination of the plurality of positioning satellites;
a pseudo distance error calculator configured to obtain a relation equation with respect to each possible combination of the plurality of positioning satellites between the error of the at least one component with respect to a corresponding combination of the plurality of positioning satellites and an error of the pseudo distance from each positioning satellite to the reception position based on the error of at least one component calculated by the component error calculator, and for solving simultaneous equations comprising the relation equation so that the error of the pseudo distance with respect to each positioning satellite is calculated; and
a second positioning device configured to correct the reception position based on the error of the pseudo distance with respect to each positioning satellite calculated by the pseudo distance error calculator,
wherein a first number of the group of positioning satellites is greater than a second number of the plurality of positioning satellites.

2. A positioning apparatus comprising:
a first positioning device configured to calculate a speed of a GPS receiver with respect to each possible combination of a plurality of positioning satellites selected from a group of positioning satellites based on a Doppler shift of a satellite signal from each positioning satellite, wherein the UPS receiver calculates the Doppler shift based on the satellite signal transmitted from a corresponding satellite and outputs the Doppler shift to the first positioning device;

a component error calculator configured to calculate an error of at least one component in a calculation result of the first positioning device with respect to each possible combination of the plurality of positioning satellites;

a Doppler shift error calculator configured to obtain a relation equation with respect to each possible combination of the plurality of positioning satellites between the error of the at least one component with respect to a corresponding combination of the plurality of positioning satellites and an error of the Doppler shift of the plurality of positioning satellites based on the error of at least one component calculated by the component error calculator, and for solving simultaneous equations comprising the relation equation so that the error of the Doppler shift with respect to each positioning satellite is calculated; and a second positioning device configured to correct the speed based on the error of the Doppler shift with respect to each positioning satellite calculated by the Doppler shift error calculator, wherein a first number of the group of positioning satellites is greater than a second number of the plurality of positioning satellites.

3. The positioning apparatus according to claim 2, wherein the at least one component in the calculation result of the first positioning device is a time component.

4. A positioning apparatus comprising:

a first positioning device configured to calculate a reception position of a GPS receiver with respect to each possible combination of a plurality of positioning satellites selected from a group of positioning satellites based on a pseudo distance from each positioning satellite to the reception position, wherein the GPS receiver calculates the pseudo distance based on a satellite signal transmitted from a corresponding satellite and outputs the pseudo distance to the first positioning device;

a component error calculator configured to calculate an error of at least one component in a calculation result of the first positioning device with respect to each possible combination of the plurality of positioning satellites;

a first pseudo distance error calculator configured to obtain a first relation equation with respect to each possible combination of the plurality of positioning satellites between the error of the at least one component with respect to a corresponding combination of the plurality of positioning satellites and an error of the pseudo distance from each positioning satellite to the reception position based on the error of at least one component calculated by the component error calculator, and for solving simultaneous equations comprising the first relation equation so that the error of the pseudo distance with respect to each positioning satellite is calculated;

a satellite selector for selecting at least one satellite having a normal satellite signal among the plurality of satellites;

a second pseudo distance error calculator configured to obtain a second relation equation with respect to each possible combination of the plurality of positioning satellites between the error of the at least one component with respect to a corresponding combination of the plurality of positioning satellites and an error of the pseudo distance from each positioning satellite to the reception position based on the error of at least one component calculated by the component error calculator, and for solving simultaneous equations comprising the second relation equation and a third relation equation so that the error of the pseudo distance with respect to each positioning satellite is corrected, wherein the third relation equation is a predetermined equation of an error of a pseudo distance with respect to the at least one satellite selected by the satellite selector;

a second positioning device configured to correct the reception position based on the error of the pseudo distance with respect to each positioning satellite calculated by the second pseudo distance error calculator, wherein a first number of the group of positioning satellites is greater than a second number of the plurality of positioning satellites.

5. A positioning apparatus comprising:

a first positioning device configured to calculate a speed of a GPS receiver with respect to each possible combination of a plurality of positioning satellites selected from a group of positioning satellites based on a Doppler shift of a satellite signal from each positioning satellite, wherein the GPS receiver calculates the Doppler shift based on the satellite signal transmitted from a corresponding satellite and outputs the Doppler shift to the first positioning device;

a component error calculator configured to calculate an error of at least one component in a calculation result of the first positioning device with respect to each possible combination of the plurality of positioning satellites;

a first Doppler shift error calculator configured to obtain a first relation equation with respect to each possible combination of the plurality of positioning satellites between the error of the at least one component with respect to a corresponding combination of the plurality of positioning satellites and an error of the Doppler shift of the plurality of positioning satellites based on the error of at least one component calculated by the component error calculator, and for solving simultaneous equations comprising the first relation equation so that the error of the Doppler shift with respect to each positioning satellite is calculated;

a satellite selector for selecting at least one satellite having a normal satellite signal among the group of satellites;

a second Doppler shift error calculator configured to obtain a second relation equation with respect to each possible combination of the plurality of positioning satellites between the error of the at least one component with respect to a corresponding combination of the plurality of positioning satellites and an error of the Doppler shift of the plurality of positioning satellites based on the error of at least one component calculated by the component error calculator, and for solving simultaneous equations comprising the second relation equation and a third relation equation so that the error of the Doppler shift with respect to each positioning satellite is corrected, wherein the third relation equation is a predetermined equation of an error of a Doppler shift with respect to the at least one satellite selected by the satellite selector; and a second positioning device configured to correct the speed based on the error of the Doppler shift with respect to each positioning satellite calculated by the second Doppler shift error calculator, wherein a first number of the group of positioning satellites is greater than a second number of the plurality of positioning satellites.

6. The positioning apparatus according to claim 5, wherein the at least one component in the calculation result of the first positioning device is a time component.

7. A positioning apparatus comprising:

a first positioning device configured to calculate a reception position of a GPS receiver with respect to each possible combination of a plurality of positioning satellites selected from a group of positioning satellites based on a pseudo distance from each positioning satellite to the reception position, wherein the GPS receiver calculates the pseudo distance based on a satellite signal transmitted from a corresponding satellite and outputs the pseudo distance to the first positioning device;

a height component error calculator configured to calculate an error of a height component of the reception position calculated by the first positioning device with respect to each possible combination of the plurality of positioning satellites;

a pseudo distance error calculator configured to obtain a relation equation with respect to each possible combination of the plurality of positioning satellites between the error of the height component with respect to a corresponding combination of the plurality of positioning satellites and an error of the pseudo distance from each positioning satellite to the reception position based on the error of the height component calculated by the height component error calculator, and for solving simultaneous equations comprising the relation equation so that the error of the pseudo distance with respect to each positioning satellite is calculated; and a second positioning device configured to correct the reception position based on the error of the pseudo distance with respect to each positioning satellite calculated by the pseudo distance error calculator, wherein a first number of the group of positioning satellites is greater than a second number of the plurality of positioning satellites.

8. The positioning apparatus according to claim 7, further comprising:

a satellite selector configured to select at least one satellite having a normal satellite signal among the group of satellites, wherein the simultaneous equations further comprises a third relation equation, and wherein the third relation equation is a predetermined equation of an error of a pseudo distance with respect to the at least one satellite selected by the satellite selector.

9. A positioning apparatus comprising:

a first positioning device configured to calculate a speed of a GPS receiver with respect to each possible combination of a plurality of positioning satellites selected from a group of positioning satellites based on a Doppler shift of a satellite signal from each positioning satellite, wherein the GPS receiver calculates the Doppler shift based on the satellite signal transmitted from a corresponding satellite and outputs the Doppler shift to the first positioning device;

a speed component error calculator configured to calculate an error of the speed in a height direction calculated by the first positioning device with respect to each possible combination of the plurality of positioning satellites;

a Doppler shift error calculator configured to obtain a relation equation with respect to each possible combination of the plurality of positioning satellites between the error of the speed in the height direction with respect to a corresponding combination of the plurality of positioning satellites and an error of the Doppler shift of the plurality of positioning satellites based on the error of the speed in the height direction calculated by the speed component error calculator, and for solving simultaneous equations comprising the relation equation so that the error of the Doppler shift with respect to each positioning satellite is calculated; and a second positioning device configured to correct the speed based on the error of the Doppler shift with respect to each positioning satellite calculated by the Doppler shift error calculator, wherein a first number of the group of positioning satellites is greater than a second number of the plurality of positioning satellites.

10. The positioning apparatus according to claim 9, further comprising:

a satellite selector configured to select at least one satellite having a normal satellite signal among the of satellites, wherein the simultaneous equations further comprises a third relation equation, and wherein the third relation equation is a predetermined equation of an error of a Doppler shift with respect to the at least one satellite selected by the satellite selector.

11. A method for correcting a reception position of a GPS receiver comprising:

calculating a reception position of a GPS receiver with respect to each possible combination of a plurality of positioning satellites selected from a group of positioning satellites based on a pseudo distance from each positioning satellite to the reception position, wherein the GPS receiver calculates the pseudo distance based on a satellite signal transmitted from a corresponding satellite;

calculating an error of at least one component in a calculation result of the calculating of the reception position with respect to each possible combination of the plurality of positioning satellites;

obtaining a relation equation with respect to each possible combination of the plurality of positioning satellites between the error of the at least one component with respect to a corresponding combination of the plurality of positioning satellites and an error of the pseudo distance from each positioning satellite to the reception position based on the error of at least one component calculated in the calculating of the error, and solving simultaneous equations comprising the relation equation so that the error of the pseudo distance with respect to each positioning satellite is calculated; and correcting the reception position based on the error of the pseudo distance with respect to each positioning satellite calculated in the obtaining of the relation equation and the solving of the simultaneous equations, wherein a first number of the group of positioning satellites is greater than a second number of the plurality of positioning satellites.

12. A non-transitory computer readable medium comprising instructions being executed by a computer, the instructions including the method for correcting the reception position of the GPS receiver according to claim 11, the method being computer-implemented.

13. A method for correcting a speed of a GPS receiver comprising:

calculating a speed of a GPS receiver with respect to each possible combination of a plurality of positioning satellites selected from a group of positioning satellites based on a Doppler shift of a satellite signal from each positioning satellite, wherein the GPS receiver calculates the Doppler shift based on the satellite signal transmitted from a corresponding satellite;

calculating an error of at least one component in a calculation result of the calculating of the speed with respect to each possible combination of the plurality of positioning satellites;

obtaining a relation equation with respect to each possible combination of the plurality of positioning satellites between the error of the at least one component with respect to a corresponding combination of the plurality of positioning satellites and an error of the Doppler shift of the plurality of positioning satellites based on the error of at least one component calculated in the calculating of the error, and solving simultaneous equations comprising the relation equation so that the error of the Doppler shift with respect to each positioning satellite is calculated; and correcting the speed based on the error of the Doppler shift with respect to each positioning satellite calculated in the obtaining of the relation equation and the solving of the simultaneous equations.

14. A non-transitory computer readable medium comprising instructions being executed by a computer, the instructions including the method for correcting the reception position of the GPS receiver according to claim 13, the method being computer-implemented.

15. A method for correcting a reception position of a GPS receiver comprising:

calculating a reception position of a GPS receiver with respect to each possible combination of a plurality of positioning satellites selected from a group of positioning satellites based on a pseudo distance from each positioning satellite to the reception position, wherein the GPS receiver calculates the pseudo distance based on a satellite signal transmitted from a corresponding satellite;

calculating an error of at least one component in a calculation result in the calculating of the reception position with respect to each possible combination of the plurality of positioning satellites;

obtaining a first relation equation with respect to each possible combination of the plurality of positioning satellites between the error of the at least one component with respect to a corresponding combination of the plurality of positioning satellites and an error of the pseudo distance from each positioning satellite to the reception position based on the error of at least one component calculated in the calculating of the error, and solving simultaneous equations comprising the first relation equation so that the error of the pseudo distance with respect to each positioning satellite is calculated;

selecting at least one satellite having a normal satellite signal among the group of satellites;

obtaining a second relation equation with respect to each possible combination of the plurality of positioning satellites between the error of the at least one component with respect to a corresponding combination of the plurality of positioning satellites and an error of the pseudo distance from each positioning satellite to the reception position based on the error of at least one component calculated in the calculating of the error, and solving simultaneous equations comprising the second relation equation and a third relation equation so that the error of the pseudo distance with respect to each positioning satellite is corrected, wherein the third relation equation is a predetermined equation of an error of a pseudo distance with respect to the at least one satellite selected in the selecting of the at least one satellite; and correcting the reception position based on the error of the pseudo distance with respect to each positioning satellite corrected in the obtaining of the second relation equation and the solving of the simultaneous equations.

16. A non-transitory computer readable medium comprising instructions being executed by a computer, the instructions including the method for correcting the reception position of the GPS receiver according to claim 15, the method being computer-implemented.

17. A method for correcting a speed of a UPS receiver comprising:

calculating a speed of a UPS receiver with respect to each possible combination of a plurality of positioning satellites selected from a group of positioning satellites based on a Doppler shift of a satellite signal from each positioning satellite, wherein the UPS receiver calculates the Doppler shift based on the satellite signal transmitted from a corresponding satellite;

calculating an error of at least one component in a calculation result in the calculating of the speed with respect to each possible combination of the plurality of positioning satellites;

obtaining a first relation equation with respect to each possible combination of the plurality of positioning satellites between the error of the at least one component with respect to a corresponding combination of the plurality of positioning satellites and an error of the Doppler shift of the plurality of positioning satellites based on the error of at least one component calculated in the calculating of the error, and solving simultaneous equations comprising the first relation equation so that the error of the Doppler shift with respect to each positioning satellite is calculated;

selecting at least one satellite having a normal satellite signal among the group of satellites;

obtaining a second relation equation with respect to each possible combination of the plurality of positioning satellites between the error of the at least one component with respect to a corresponding combination of the plurality of positioning satellites and an error of the Doppler shift of the plurality of positioning satellites based on the error of at least one component calculated in the calculating of the error, and solving simultaneous equations comprising the second relation equation and a third relation equation so that the error of the Doppler shift with respect to each positioning satellite is corrected, wherein the third relation equation is a predetermined equation of an error of a Doppler shift with respect to the at least one satellite selected in the selecting of the at least one satellite; and correcting the speed based on the error of the Doppler shift with respect to each positioning satellite corrected in the obtaining of the second relation equation and the solving of the simultaneous equations.

18. A non-transitory computer readable medium comprising instructions being executed by a computer, the instructions including the method for correcting the reception position of the GPS receiver according to claim 17, the method being computer-implemented.

19. A method for correcting a reception position of a GPS receiver comprising:

calculating a reception position of a GPS receiver with respect to each possible combination of a plurality of positioning satellites selected from a group of positioning satellites based on a pseudo distance from each positioning satellite to the reception position, wherein the OPS receiver calculates the pseudo distance based on a satellite signal transmitted from a corresponding satellite;

calculating an error of a height component of the reception position calculated in the calculating of the reception position with respect to each possible combination of the plurality of positioning satellites;

obtaining a relation equation with respect to each possible combination of the plurality of positioning satellites between the error of the height component with respect to a corresponding combination of the plurality of positioning satellites and an error of the pseudo distance from each positioning satellite to the reception position based on the error of the height component calculated in the calculating of the error, and solving simultaneous equations comprising the relation equation so that the error of the pseudo distance with respect to each positioning satellite is calculated; and correcting the reception position based on the error of the pseudo distance with respect to each positioning satellite calculated in the obtaining of the relation equation and the solving of the simultaneous equations, 20. A non-transitory computer readable medium comprising instructions being executed by a computer, the instructions including the method for correcting the reception position of the GPS receiver according to claim 19, the method being computer-implemented.

21. A method for correcting a speed of a. GPS receiver comprising:

calculating a speed of a GPS receiver with respect to each possible combination of a plurality of positioning satellites selected from a group of positioning satellites based on a Doppler shift of a satellite signal from each positioning satellite, wherein the GPS receiver calculates the Doppler shift based on the satellite signal transmitted from a corresponding satellite;

calculating an error of the speed in a height direction calculated in the calculating of the speed with respect to each possible combination of the plurality of positioning satellites;

obtaining a relation equation with respect to each possible combination of the plurality of positioning satellites between the error of the speed in the height direction with respect to a corresponding combination of the plurality of positioning satellites and an error of the Doppler shift of the plurality of positioning satellites based on the error of the speed in the height direction calculated in the calculating of the error, and solving simultaneous equations comprising the relation equation so that the error of the Doppler shift with respect to each positioning satellite is calculated; and correcting the speed based on the error of the Doppler shift with respect to each positioning satellite calculated in the obtaining of the relation equation and the solving of the simultaneous equations.

22. A non-transitory computer readable medium comprising instructions being executed by a computer, the instructions including the method for correcting the reception position of the GPS receiver according to claim 21, the method being computer-implemented.

* * * * *